United States Patent
Oostdyk et al.

(10) Patent No.: US 9,631,780 B2
(45) Date of Patent: Apr. 25, 2017

(54) STREET LIGHTING DEVICE FOR COMMUNICATING WITH OBSERVERS AND ASSOCIATED METHODS

(71) Applicant: Lighting Science Group Corporation, Melbourne, FL (US)

(72) Inventors: Mark Andrew Oostdyk, Cape Canaveral, FL (US); Addy S. Widjaja, Palm Bay, FL (US); Fredric S. Maxik, Cocoa Beach, FL (US); David E. Bartine, Cocoa, FL (US); Robert R. Soler, Cocoa Beach, FL (US); Ran Zhou, Rockledge, FL (US); James Lynn Schellack, Skiatook, OK (US)

(73) Assignee: Lighting Science Group Corporation, Melbourne, FL (US)

( * ) Notice: Subject to any disclaimer, the term of this patent is extended or adjusted under 35 U.S.C. 154(b) by 0 days.

(21) Appl. No.: 14/959,664

(22) Filed: Dec. 4, 2015

(65) Prior Publication Data
US 2016/0153621 A1    Jun. 2, 2016

Related U.S. Application Data

(63) Continuation of application No. 14/275,480, filed on May 12, 2014, now Pat. No. 9,255,670, which is a
(Continued)

(51) Int. Cl.
*F21K 99/00* (2016.01)
*F21S 8/00* (2006.01)
(Continued)

(52) U.S. Cl.
CPC .............. *F21K 9/50* (2013.01); *F21K 9/60* (2016.08); *F21S 8/032* (2013.01); *F21V 23/003* (2013.01);
(Continued)

(58) Field of Classification Search
CPC .......... F21K 9/50; F21V 23/003; F21S 8/032; F21W 2111/02; F21Y 2101/02
See application file for complete search history.

(56) References Cited

U.S. PATENT DOCUMENTS

| 3,332,327 A | 7/1967 | Heenan |
| 3,409,344 A | 11/1968 | Balint et al. |

(Continued)

FOREIGN PATENT DOCUMENTS

| DE | 202005013164 | 11/2005 |
| DE | 102005059362 | 9/2006 |

(Continued)

OTHER PUBLICATIONS

Arthur P. Fraas, Heat Exchanger Design, 1989, p. 60, John Wiley & Sons, Inc., Canada.

(Continued)

*Primary Examiner* — Tracie Y Green
(74) *Attorney, Agent, or Firm* — Mark Malek; Daniel Pierron; Widerman Malek, PL

(57) ABSTRACT

A thoroughfare lighting device comprising a housing configured to be attached to a thoroughfare surface, a plurality of LEDs configured to selectively illuminate individual lanes of the thoroughfare surface, the plurality of LEDs comprising a first set of LEDs configured to emit a generally white light and a second set of LEDs configured to emit colored light that is operable to selectively emit light so as to illuminate individual lanes of the thoroughfare surface, a driver circuit configured to operate the second set of LEDs to emit a colored light indicating the condition of a first lane of the thoroughfare surface, and an optic carried by the housing and positioned in optical communication with the plurality of LEDs.

14 Claims, 14 Drawing Sheets

Related U.S. Application Data continuation-in-part of application No. 13/839,131, filed on Mar. 15, 2013, now Pat. No. 8,899,775.

(60) Provisional application No. 61/823,013, filed on May 14, 2013.

(51) Int. Cl.

| | | |
|---|---|---|
| *F21V 29/505* | (2015.01) | |
| *F21V 29/70* | (2015.01) | |
| *F21V 23/00* | (2015.01) | |
| *F21K 9/60* | (2016.01) | |
| *F21W 111/02* | (2006.01) | |
| *F21Y 101/00* | (2016.01) | |

(52) U.S. Cl.
CPC ............ *F21V 29/505* (2015.01); *F21V 29/70* (2015.01); *F21W 2111/02* (2013.01); *F21Y 2101/00* (2013.01); *Y02B 20/72* (2013.01)

(56) References Cited

U.S. PATENT DOCUMENTS

| | | | |
|---|---|---|---|
| 3,984,175 | A | 10/1976 | Suhr et al. |
| 4,668,120 | A * | 5/1987 | Roberts ............... G02B 6/0001 404/12 |
| 5,057,908 | A | 10/1991 | Weber |
| 5,061,114 | A | 10/1991 | Hedgewick |
| 5,449,244 | A | 9/1995 | Sandino |
| 5,523,878 | A | 6/1996 | Wallace et al. |
| 5,704,701 | A | 1/1998 | Kavanagh et al. |
| 5,963,192 | A | 10/1999 | Wong et al. |
| 5,997,150 | A | 12/1999 | Anderson |
| 6,140,646 | A | 10/2000 | Busta et al. |
| 6,149,283 | A | 11/2000 | Conway et al. |
| 6,150,774 | A | 11/2000 | Mueller et al. |
| 6,250,774 | B1 | 6/2001 | Begemann et al. |
| 6,341,876 | B1 | 1/2002 | Moss et al. |
| 6,356,700 | B1 | 3/2002 | Strobl |
| 6,561,656 | B1 | 5/2003 | Kojima et al. |
| 6,594,090 | B2 | 7/2003 | Kruschwitz et al. |
| 6,598,996 | B1 | 7/2003 | Lodhie |
| 6,601,984 | B2 | 8/2003 | Yamamoto et al. |
| 6,624,845 | B2 | 9/2003 | Lloyd et al. |
| 6,676,279 | B1 | 1/2004 | Hubbell et al. |
| 6,705,744 | B2 | 3/2004 | Hubbell et al. |
| 6,707,611 | B2 | 3/2004 | Gardiner et al. |
| 6,733,135 | B2 | 5/2004 | Dho |
| 6,767,111 | B1 | 7/2004 | Lai |
| 6,774,916 | B2 | 8/2004 | Pettitt et al. |
| 6,811,258 | B1 | 11/2004 | Grant |
| 6,817,735 | B2 | 11/2004 | Shimizu et al. |
| 6,870,523 | B1 | 3/2005 | Ben-David et al. |
| 6,871,982 | B2 | 3/2005 | Holman et al. |
| 6,906,852 | B1 | 6/2005 | Russell |
| 6,967,761 | B2 | 11/2005 | Starkweather et al. |
| 6,974,713 | B2 | 12/2005 | Patel et al. |
| 6,987,464 | B2 * | 1/2006 | Pearson ............... G08G 1/07 200/19.17 |
| 7,014,336 | B1 | 3/2006 | Ducharme et al. |
| 7,042,623 | B1 | 5/2006 | Huibers et al. |
| 7,070,281 | B2 | 7/2006 | Kato |
| 7,072,096 | B2 | 7/2006 | Holman et al. |
| 7,075,707 | B1 | 7/2006 | Rapaport et al. |
| 7,083,304 | B2 | 8/2006 | Rhoads et al. |
| 7,093,956 | B2 | 8/2006 | Miller et al. |
| 7,095,056 | B2 | 8/2006 | Vitta et al. |
| 7,178,941 | B2 | 2/2007 | Roberge et al. |
| 7,184,201 | B2 | 2/2007 | Duncan |
| 7,246,923 | B2 | 7/2007 | Conner |
| 7,255,469 | B2 | 8/2007 | Wheatley et al. |
| 7,261,453 | B2 | 8/2007 | Morejon et al. |
| 7,274,307 | B2 * | 9/2007 | Povey ............... G08G 1/095 340/815.66 |
| 7,289,090 | B2 | 10/2007 | Morgan |
| 7,300,177 | B2 | 11/2007 | Conner |
| 7,303,291 | B2 | 12/2007 | Ikeda et al. |
| 7,325,956 | B2 | 2/2008 | Morejon et al. |
| 7,342,658 | B2 | 3/2008 | Kowarz et al. |
| 7,344,279 | B2 | 3/2008 | Mueller et al. |
| 7,349,095 | B2 | 3/2008 | Kurosaki |
| 7,353,859 | B2 | 4/2008 | Stevanovic et al. |
| 7,382,091 | B2 | 6/2008 | Chen |
| 7,382,632 | B2 | 6/2008 | Alo et al. |
| 7,400,439 | B2 | 7/2008 | Holman |
| 7,427,146 | B2 | 9/2008 | Conner |
| 7,429,983 | B2 | 9/2008 | Islam |
| 7,434,946 | B2 | 10/2008 | Huibers |
| 7,438,443 | B2 | 10/2008 | Tatsuno et al. |
| 7,476,016 | B2 | 1/2009 | Kurihara |
| 7,520,642 | B2 | 4/2009 | Holman et al. |
| 7,530,708 | B2 | 5/2009 | Park |
| 7,537,347 | B2 | 5/2009 | Dewald |
| 7,540,616 | B2 | 6/2009 | Conner |
| 7,545,569 | B2 | 6/2009 | Cassarly |
| 7,556,406 | B2 | 7/2009 | Petroski et al. |
| 7,598,686 | B2 | 10/2009 | Lys et al. |
| 7,605,971 | B2 | 10/2009 | Ishii et al. |
| 7,626,755 | B2 | 12/2009 | Furuya et al. |
| 7,628,508 | B2 | 12/2009 | Kita et al. |
| 7,677,736 | B2 | 3/2010 | Kasazumi et al. |
| 7,684,007 | B2 | 3/2010 | Hull et al. |
| 7,703,943 | B2 | 4/2010 | Li et al. |
| 7,709,811 | B2 | 5/2010 | Conner |
| 7,719,766 | B2 | 5/2010 | Grasser et al. |
| 7,731,383 | B2 | 6/2010 | Myer |
| 7,759,854 | B2 | 7/2010 | Miller et al. |
| 7,766,490 | B2 | 8/2010 | Harbers et al. |
| 7,777,166 | B2 | 8/2010 | Roberts |
| 7,819,556 | B2 | 10/2010 | Heffington et al. |
| 7,828,453 | B2 | 11/2010 | Tran et al. |
| 7,828,465 | B2 | 11/2010 | Roberge et al. |
| 7,832,878 | B2 | 11/2010 | Brukilacchio et al. |
| 7,834,867 | B2 | 11/2010 | Sprague et al. |
| 7,835,056 | B2 | 11/2010 | Doucet et al. |
| 7,845,823 | B2 | 12/2010 | Mueller et al. |
| 7,850,321 | B2 | 12/2010 | Wang et al. |
| 7,850,335 | B2 | 12/2010 | Hsu et al. |
| 7,863,829 | B2 | 1/2011 | Sayers et al. |
| 7,889,430 | B2 | 2/2011 | El-Ghoroury et al. |
| 7,909,479 | B2 | 3/2011 | Rooymans |
| 7,928,565 | B2 | 4/2011 | Brunschwiler et al. |
| 7,942,537 | B2 | 5/2011 | Krijn et al. |
| 7,959,320 | B2 | 6/2011 | Mueller et al. |
| 7,972,030 | B2 | 7/2011 | Li |
| 7,976,205 | B2 | 7/2011 | Grotsch et al. |
| 8,016,443 | B2 | 9/2011 | Falicoff et al. |
| 8,021,021 | B2 | 9/2011 | Paolini |
| 8,047,660 | B2 | 11/2011 | Penn et al. |
| 8,061,857 | B2 | 11/2011 | Liu et al. |
| 8,061,869 | B2 | 11/2011 | Lo et al. |
| 8,070,302 | B2 | 12/2011 | Hatanaka et al. |
| 8,070,324 | B2 | 12/2011 | Kornitz et al. |
| 8,083,364 | B2 | 12/2011 | Allen |
| 8,096,668 | B2 | 1/2012 | Abu-Ageel |
| 8,096,685 | B2 | 1/2012 | Lu et al. |
| 8,100,552 | B2 | 1/2012 | Spero |
| 8,118,456 | B2 | 2/2012 | Reed et al. |
| 8,130,099 | B2 | 3/2012 | Steinel et al. |
| 8,136,969 | B2 | 3/2012 | Burkett et al. |
| 8,143,811 | B2 | 3/2012 | Shloush et al. |
| 8,246,194 | B2 | 8/2012 | Lai |
| 8,297,783 | B2 | 10/2012 | Kim |
| 8,308,318 | B2 | 11/2012 | Maxik et al. |
| 8,322,889 | B2 | 12/2012 | Petroski |
| 8,331,099 | B2 | 12/2012 | Geissler et al. |
| 8,337,029 | B2 | 12/2012 | Li |
| 8,337,063 | B2 | 12/2012 | Nagasawa et al. |
| 8,427,590 | B2 | 4/2013 | Raring et al. |
| 8,475,002 | B2 | 7/2013 | Maxik et al. |
| 8,491,153 | B2 | 7/2013 | Maxik et al. |
| 8,531,126 | B2 | 9/2013 | Kaihotsu et al. |
| 8,616,736 | B2 | 12/2013 | Pan |
| 8,662,672 | B2 | 3/2014 | Hikmet et al. |

(56) References Cited

U.S. PATENT DOCUMENTS

| | | |
|---|---|---|
| 8,678,787 B2 | 3/2014 | Hirata et al. |
| 8,733,949 B2 | 5/2014 | Chong et al. |
| 8,770,773 B2 | 7/2014 | Yoshida |
| 8,774,142 B2 * | 7/2014 | Rajagopal ............ H04B 10/114 370/277 |
| 8,819,313 B1 * | 8/2014 | Walther ................ G08G 1/097 709/208 |
| 8,899,775 B2 | 12/2014 | Maxik et al. |
| 9,158,009 B2 | 10/2015 | Yoshida et al. |
| 9,255,670 B2 | 2/2016 | Oostdyk et al. |
| 2004/0052076 A1 | 3/2004 | Mueller et al. |
| 2005/0238425 A1 | 10/2005 | Safar |
| 2005/0265023 A1 | 12/2005 | Scholl |
| 2006/0002108 A1 | 1/2006 | Ouderkirk et al. |
| 2006/0002110 A1 | 1/2006 | Dowling et al. |
| 2006/0056169 A1 | 3/2006 | Lodhie et al. |
| 2006/0103777 A1 | 5/2006 | Ko et al. |
| 2006/0164005 A1 | 7/2006 | Sun |
| 2006/0285193 A1 | 12/2006 | Kimura et al. |
| 2007/0013871 A1 | 1/2007 | Marshall et al. |
| 2007/0081339 A1 | 4/2007 | Chung et al. |
| 2007/0188847 A1 | 8/2007 | McDonald et al. |
| 2007/0241340 A1 | 10/2007 | Pan |
| 2008/0043464 A1 | 2/2008 | Ashdown |
| 2008/0055065 A1 | 3/2008 | Feldmeier |
| 2008/0143973 A1 | 6/2008 | Wu |
| 2008/0198572 A1 | 8/2008 | Medendorp |
| 2008/0232084 A1 | 9/2008 | Kon |
| 2008/0303695 A1 * | 12/2008 | Meshkin ................ G08G 1/07 340/908 |
| 2009/0059099 A1 | 3/2009 | Linkov et al. |
| 2009/0059585 A1 | 3/2009 | Chen et al. |
| 2009/0128781 A1 | 5/2009 | Li |
| 2010/0039704 A1 | 2/2010 | Hayashi et al. |
| 2010/0098488 A1 | 4/2010 | Huck et al. |
| 2010/0103389 A1 | 4/2010 | McVea et al. |
| 2010/0202129 A1 | 8/2010 | Abu-Ageel |
| 2010/0321641 A1 | 12/2010 | Van Der Lubbe |
| 2012/0218774 A1 | 8/2012 | Livingston |
| 2012/0285667 A1 | 11/2012 | Maxik et al. |
| 2013/0294071 A1 | 11/2013 | Boomgaarden et al. |

FOREIGN PATENT DOCUMENTS

| | | |
|---|---|---|
| EP | 2410240 | 1/2012 |
| WO | WO 2005072279 | 8/2005 |
| WO | WO 2007/069185 | 6/2007 |
| WO | WO 2008/019481 | 2/2008 |
| WO | WO 2009/040703 | 4/2009 |

OTHER PUBLICATIONS

H. A El-Shaikh, S. V. Garimella, "Enhancement of Air Jet Impingement Heat Transfer using Pin-Fin Heat Sinks", D IEEE Transactions on Components and Packaging Technology, Jun. 2000, vol. 23, No. 2.

J. Y. San, C. H. Huang, M. H, Shu, "Impingement cooling of a confined circular air jet", In t. J. Heat Mass Transf. , 1997. pp. 1355-1364, vol. 40.

N. T. Obot, W. J. Douglas, A S. Mujumdar, "Effect of Semi-confinement on Impingement Heat Transfer", Proc. 7th Int. Heat Transf. Conf., 1982, pp. 1355-1364. vol. 3.

S. A Solovitz, L. D. Stevanovic, R. A Beaupre, "Microchannels Take Heatsinks to the Next Level", Power Electronics Technology, Nov. 2006.

Yongmann M. Chung, Kai H. Luo, "Unsteady Heat Transfer Analysis of an Impinging Jet", Journal of Heat Transfer—Transactions of the ASME, Dec. 2002, pp. 1039-1048, vol. 124, No. 6.

\* cited by examiner

STREET LIGHTING DEVICE FOR COMMUNICATING WITH OBSERVERS AND ASSOCIATED METHODS

RELATED APPLICATIONS

This application is a continuation and claims benefit under 35 U.C.S. §120 of U.S. patent application Ser. No. 14/275,480 titled Street Lighting Device for Communicating with Observers and Associated Methods filed May 12, 2014, which in turn claims the benefit under 35 U.S.C. §119(e) of U.S. Provisional Patent Application Ser. No. 61/823,013 titled Street Lighting Device for Communicating with Observers and Associated Methods filed May 14, 2013, and is a continuation-in-part and claims benefit under 35 U.S.C. §120 of U.S. patent application Ser. No. 13/839,131 titled Low-Angle Thoroughfare Surface Lighting Device filed on Mar. 15, 2013, the content of each of which is incorporated by reference herein in their entireties except to the extent disclosures therein are inconsistent with disclosure herein.

FIELD OF THE INVENTION

The present invention relates to the fields of lighting devices and, more specifically, to roadway reflectors and surface lighting devices adapted to communicate with observers.

BACKGROUND OF THE INVENTION

Lighting is used to illuminate roadways, bikeways, walkways, sidewalks, pathways, bridges, ramps, tunnels, curbs, parking lots, driveways, roadway barriers, drainage structures, utility structures, and many other objects. The lighting devices commonly used for illuminating roadway or other similar surfaces are overhead lights, particularly overhead street lamps. Overhead lighting devices commonly provide inefficient lighting and the majority of light emitted is absorbed by the roadway, structure, or other object and fails to efficiently illuminate the intended object(s).

Furthermore, lighting technologies such as light-emitting diodes (LEDs) offer significant advantages over incandescent, fluorescent, and high pressure sodium lamps that are often used in roadway overhead lights. These advantages include, but are not limited to, better lighting quality, longer operating life, and lower energy consumption. The majority of lighting devices used for roadways, bikeways, walkways, sidewalks, pathways, bridges, ramps, tunnels, curbs, parking lots, driveways, roadway barriers, drainage structures, utility structures, and other similar objects are often inefficient and need repair or replacement often. Although the use of LED lighting devices for overhead lighting presents significant advantages over traditional roadway lighting that uses incandescent or fluorescent lights, absorption of light may sometimes require the use of larger LEDs and/or an increased amount of LEDs to provide sufficient illumination. Therefore, there is a need for an improved and more efficient lighting system where the majority of the amount of light emitted is not absorbed.

Roadway reflectors come in several standard shapes, such as, for example rectangular or circular. Roadway reflectors have not been designed with the intent to illuminate other objects, such as roadways, bikeways, walkways, sidewalks, pathways, bridges, ramps, tunnels, curbs, parking lots, driveways, roadway barriers, drainage structures, utility structures, and other similar objects. Therefore, there is a need for an improved roadway reflector that also illuminates adjacent surfaces without emitting glare-causing light into oncoming traffic, thereby illuminating only the surfaces of the intended objects, while also emitting light that may indicate a condition of the roadway relevant to oncoming traffic.

U.S. Pat. No. 3,332,327 to Heenan, U.S. Pat. No. 3,409,344 to Balint et al., U.S. Pat. No. 3,984,175 to Suhr et al., and U.S. Pat. No. 5,061,114 to Hedgewick disclose reflective roadway markers having a shell-like housing and a reflective portion of light transmitting material carried by the housing. The marker in all of these patents may not have any light source or power generating elements and may not have sidewalls that are slanted, curved, partially slanted, or partially curved.

U.S. patent application Ser. No. 12/502,232 to Huck et al. discloses a solar powered road marker light that is self-powered and self-illuminating with relatively low energy consumption. The road marker light is installed on road dividers, markers, signs, traffic barriers, traffic control devices, etc. The road marker light may not be installed on a thoroughfare surface, such as a roadway, pathway, sidewalk, curb, or other similar surface. Further, the road marker light may only illuminate the housing of the road marker light and does not illuminate the thoroughfare surface.

U.S. patent application Ser. No. 10/829,800 to Safar discloses flashing red or yellow light in the direction of oncoming traffic so as to relay an advance warning of slowed, stopped, or all-clear traffic conditions to the oncoming traffic. However, Safar does not disclose, and the structure of the system of Safar precludes, a system that may successfully emit illuminating light that does not cause glare in oncoming vehicles while also emitting light indicating a condition of the traffic condition.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a thoroughfare lighting device comprising a housing configured to be attached to a thoroughfare surface, having a top surface, a proximal face, a distal face, and first and second opposing sidewalls extending between the proximal and distal faces and extending downwardly from the top surface, a driver circuit, and a plurality of light-emitting diodes (LEDs) electrically coupled to the driver circuit. The plurality of LEDs may comprise a first set of LEDs configured to emit a generally white light and a second set of LEDs configured to emit colored light that is observable by an observer. The lighting device may further comprise an optic carried by the housing and positioned in optical communication with the plurality of LEDs. The color of light emitted by the second set of LEDs may be selectable to indicate a condition of the associated thoroughfare in a direction of travel of the observer to the observer. Furthermore, the first sidewall may taper in a direction of the distal face.

In some embodiments, the plurality of LEDs may be configured to selectively illuminate individual lanes of the associated thoroughfare. Furthermore, the driver circuit may be configured to operate the second set of LEDs to emit light so as to indicate a condition in a first lane of the associated thoroughfare and not indicate a condition in a second lane of the associated thoroughfare. Additionally, the driver circuit may be configured to operate the plurality of LEDs to transmit data via visible light communication to another thoroughfare lighting device.

In some embodiments, the second set of LEDs may comprise LEDs configured to emit light having a first color and LEDs configured to emit light having a second color that is difference from the first color. The second set of LEDs may be configured to emit at least one of blue light, red light, yellow light, and amber light. Furthermore, the driver circuit may be configured to operate the second set of LEDs to emit a red light to indicate a stop in traffic, a yellow or amber light to indicate a slow-down in traffic, and a blue light to indicate the presence or imminent arrival of an emergency vehicle.

In some embodiments, the lighting device may further comprise a traffic sensor electrically coupled to the driver circuit. The traffic sensor may be configured to sense a traffic pattern and generate information regarding traffic on the associated thoroughfare. Furthermore, the driver circuit may be configured to operate the plurality of LEDs responsive to the information generated by the traffic sensor. In some embodiments, the driver circuit may be configured to alternately flash the first set of LEDs and the second set of LEDs.

In some embodiments, the second sidewall may be configured to taper in the direction of the distal face. Furthermore, the optic may be a first optic and carried by the first sidewall. Additionally, the lighting device may further comprise a second optic carried by the second sidewall. The plurality of LEDs may be divided such that a portion of each of the first and second sets of LEDs are in optical communication with the first optic and another portion of each of the first and second sets of LEDs are in optical communication with the second optic.

Furthermore, in some embodiments, the second sidewall may taper in the direction of the proximal face, and the optic may be a first optic and carried by the first sidewall. Additionally, the lighting device may further comprise a second optic carried by the second sidewall. The plurality of LEDs may be divided such that a portion of each of the first and second sets of LEDs are in optical communication with the first optic and another portion of each of the first and second sets of LEDs are in optical communication with the second optic.

Additionally, embodiments of the present invention are related to a thoroughfare lighting device configured to be positioned adjacent to a thoroughfare comprising a housing, the housing comprising a base member, a sidewall extending generally upwardly from the base member, a driver circuit, and a top section comprising an optic, a first set of LEDs configured to emit a generally white light, and a second set of LEDs configured to emit colored light, each of the first and second sets of LEDs being electrically coupled to the driver circuit. The lighting device may further comprise a communication device electrically coupled to the driver circuit. The first set of LEDs may be positioned so as to emit light at an angle below a plane that is parallel to a plane defined by a surface of the thoroughfare, and the second set of LEDs may be positioned so as to emit light at an angle approximately parallel to or above a plane that is parallel to the plane defined by the surface of the thoroughfare. Additionally, the color of light emitted by the second set of LEDs is selected to indicate a condition of the associated thoroughfare in a direction of travel of the observer.

The communication device may be configured to receive information related to a condition of the thoroughfare. Furthermore, the driver circuit may be configured to operate the first and second sets of LEDs responsive to the information received from the communication device. Additionally, in some embodiments, the first and second of LEDs may be configured to selectively illuminate individual lanes of the associated thoroughfare. The driver circuit may be configured to operate the second set of LEDs to emit light so as to indicate a condition in a first lane of the associated thoroughfare and not indicate a condition in a second lane of the associated thoroughfare.

In some embodiments, the communication device may be configured to receive information related to travel of an emergency vehicle including a lane of travel of the emergency vehicle; and wherein the driver circuit is configured to selectively operate the second set of LEDs to indicate the lane of travel of the emergency vehicle.

Additionally, the lighting device may further comprise a traffic sensor electrically coupled to the driver circuit. The traffic sensor may be configured to sense a traffic pattern and generate information regarding traffic on the associated thoroughfare. Furthermore, the driver circuit may be configured to operate at least one of the first and second of LEDs responsive to the information generated by the traffic sensor. Additionally, the communication device may be configured to transmit the information generated by the traffic sensor to at least one of another thoroughfare lighting device and a traffic monitoring center.

DETAILED DESCRIPTION OF THE PREFERRED EMBODIMENT

Figure 1A:
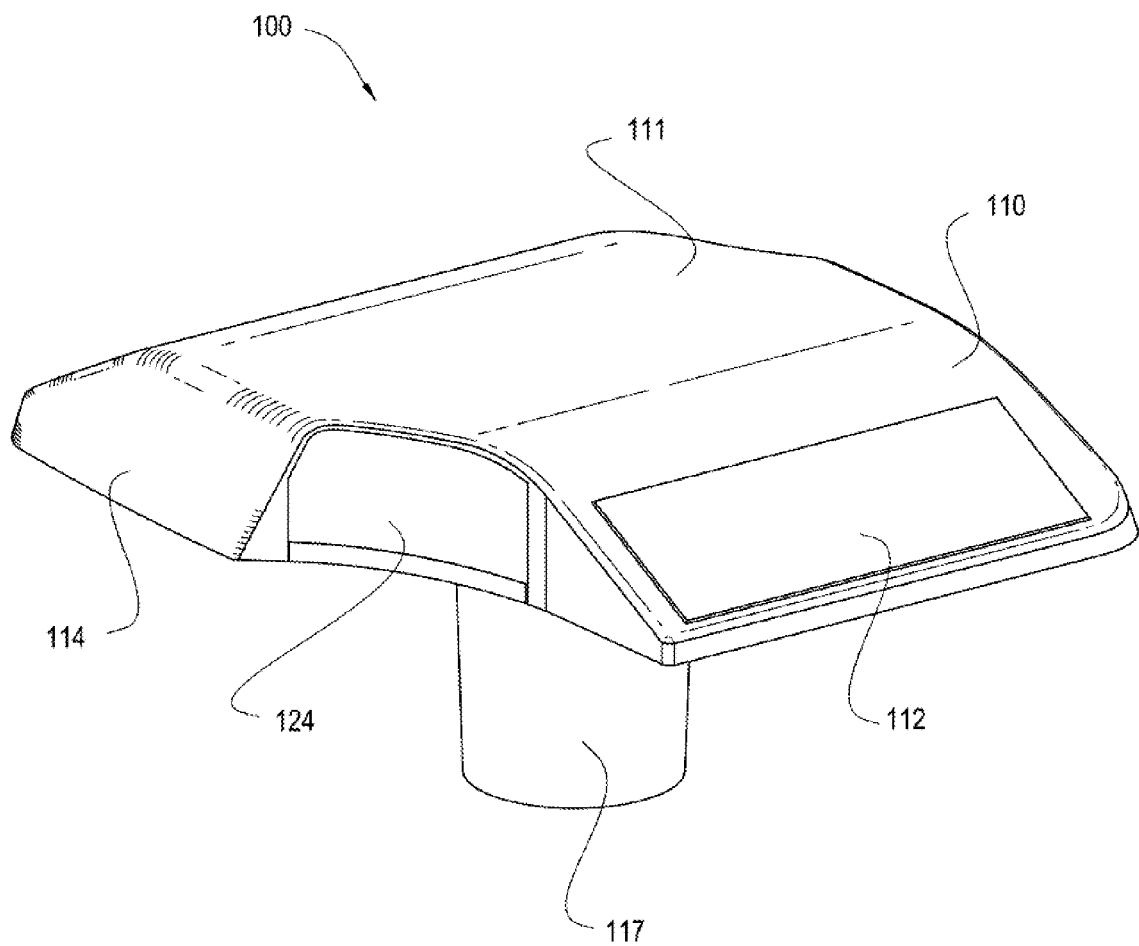
FIG. 1A is a right side perspective view of a lighting device according to an embodiment of the present invention.

The present invention will now be described fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art will realize that the following embodiments of the present invention are only illustrative and are not intended to be limiting in any way. Other embodiments of the present invention will readily suggest themselves to such skilled persons having the benefit of this disclosure. Additionally, like numbers refer to like elements throughout.

Throughout this disclosure, the present invention may be referred to as relating to luminaires, digital lighting, and light-emitting diodes (LEDs). Those skilled in the art will appreciate that this terminology is only illustrative and does not affect the scope of the invention. For instance, the present invention may just as easily relate to lasers or other digital lighting technologies. Additionally, a person of skill in the art will appreciate that the use of LEDs within this disclosure is not intended to be limited to any specific form of LED, and should be read to apply to light emitting semiconductors in general. Accordingly, skilled artisans should not view the following disclosure as limited to any particular light emitting semiconductor device, and should read the following disclosure broadly with respect to the same.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention. Those skilled in the art will appreciate that many variations and alterations to the descriptions contained herein are within the scope of the invention.

Referring to FIGS. 1-10, a lighting device 100 according to an embodiment of the present invention is now described in detail. Throughout this disclosure, the present invention may be referred to as a lighting device 100, a lighting system, an LED lighting system, a lamp system, a lamp, a luminaire, a device, a system, a product, and a method. Those skilled in the art will appreciate that this terminology is only illustrative and does not affect the scope of the invention.

According to embodiments of the present invention, as depicted, for example, in FIGS. 1-10, the lighting device 100 may include a housing 110, a first primary optic 120, a first light source 127, and a circuitry 140. The lighting device 100 may further include a second primary optic 121, a second light source 128, a first and second secondary optics 124, 125, an ambient light sensor 130, a power generating element 131, a driver circuit 141, a battery 145, a photovoltaic device 132, a communication device 143, a microcontroller 142, a traffic sensor 144, a reflective member 150, and a heat sink 160. The housing 110 may be attached to a thoroughfare surface and may include a top surface 111, a proximal face 112, a distal face 113, first and second opposing sidewalls 114, 115, and first and second slanted sections 118, 119. The housing 110 may further include a top inner surface 133 that may cooperate with the photovoltaic device 132 to define a photovoltaic device chamber 134. The housing 110 may additionally include a bottom member 116. Although not illustrated in the figures, the bottom member 116 may include a post 117. The post 117 may include the circuitry 140 and/or the heat sink 160. As shown in the present embodiment, the circuitry 140 may be carried by the housing.

The thoroughfare surface may be any surface to which the lighting device 100 may be attached to or carried by. The thoroughfare may be any object or structure that has a surface, particularly those that allow vehicular, air, bicycle, pedestrian, or other traffic. For example, a thoroughfare surface may be a roadway, a bikeway, a walkway, a sidewalk, a pathway, a bridge, a ramp, a tunnel, a curb, a parking lot, a driveway, a roadway barrier, a drainage structure, a utility structure, or any other similar object or structure. Those skilled in the art will appreciate that this terminology is only illustrative and does not affect the scope of the invention.

Figure 8:
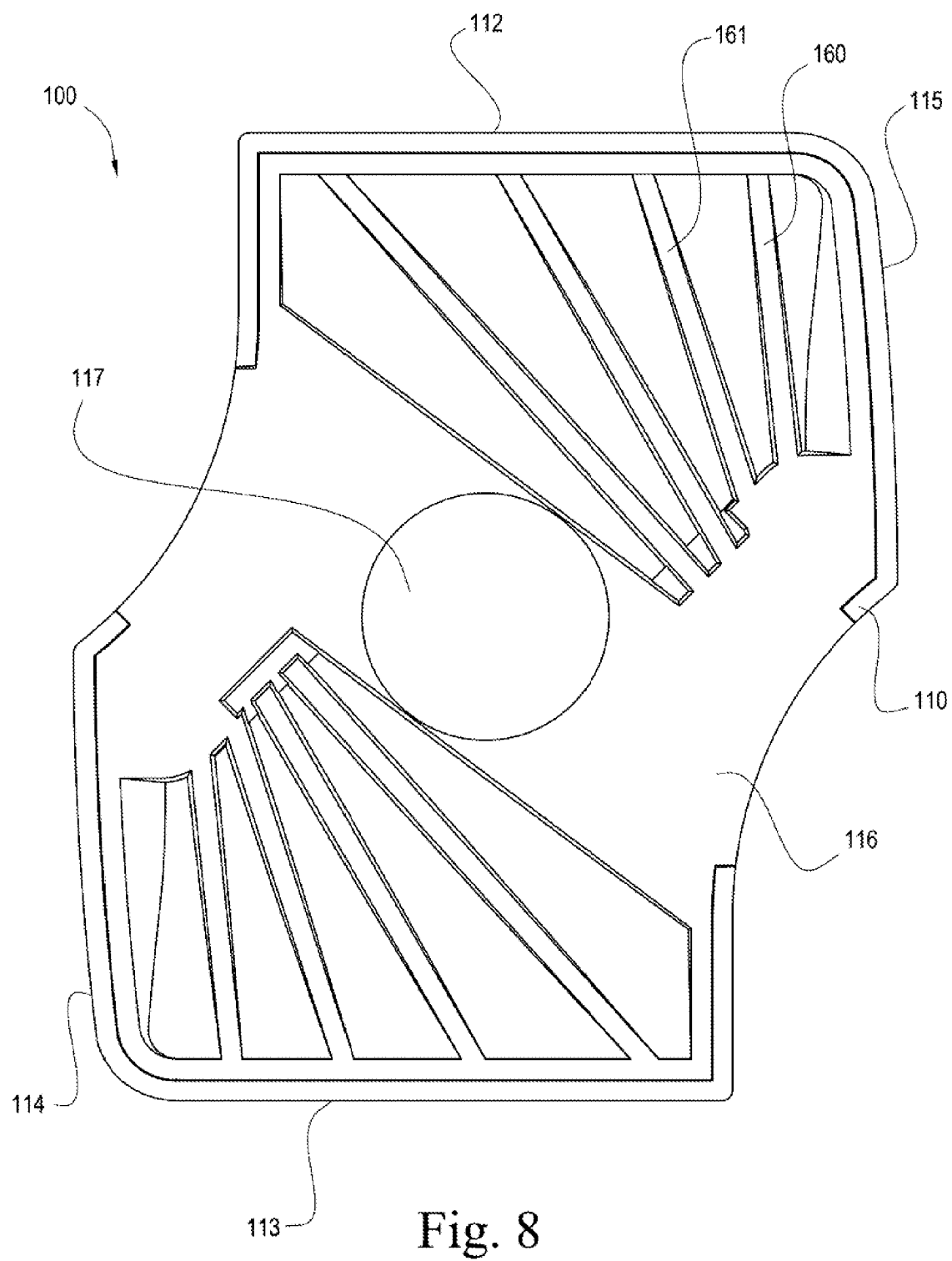
FIG. 8 is a bottom plan view of the lighting device illustrated in FIG. 1A.
Figure 10:
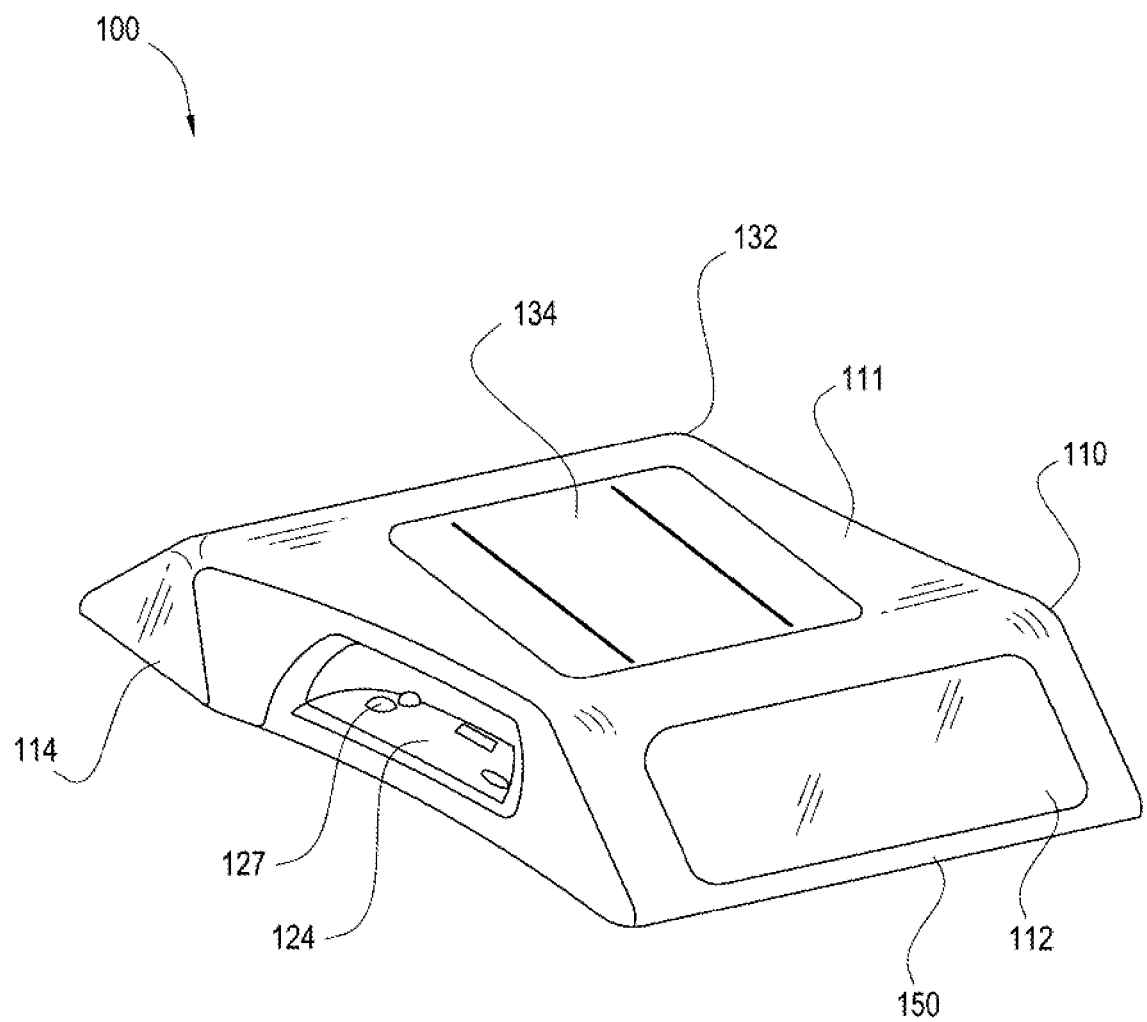
FIG. 10 is a perspective view of a lighting device according to another embodiment of the present invention.
Figure 11:
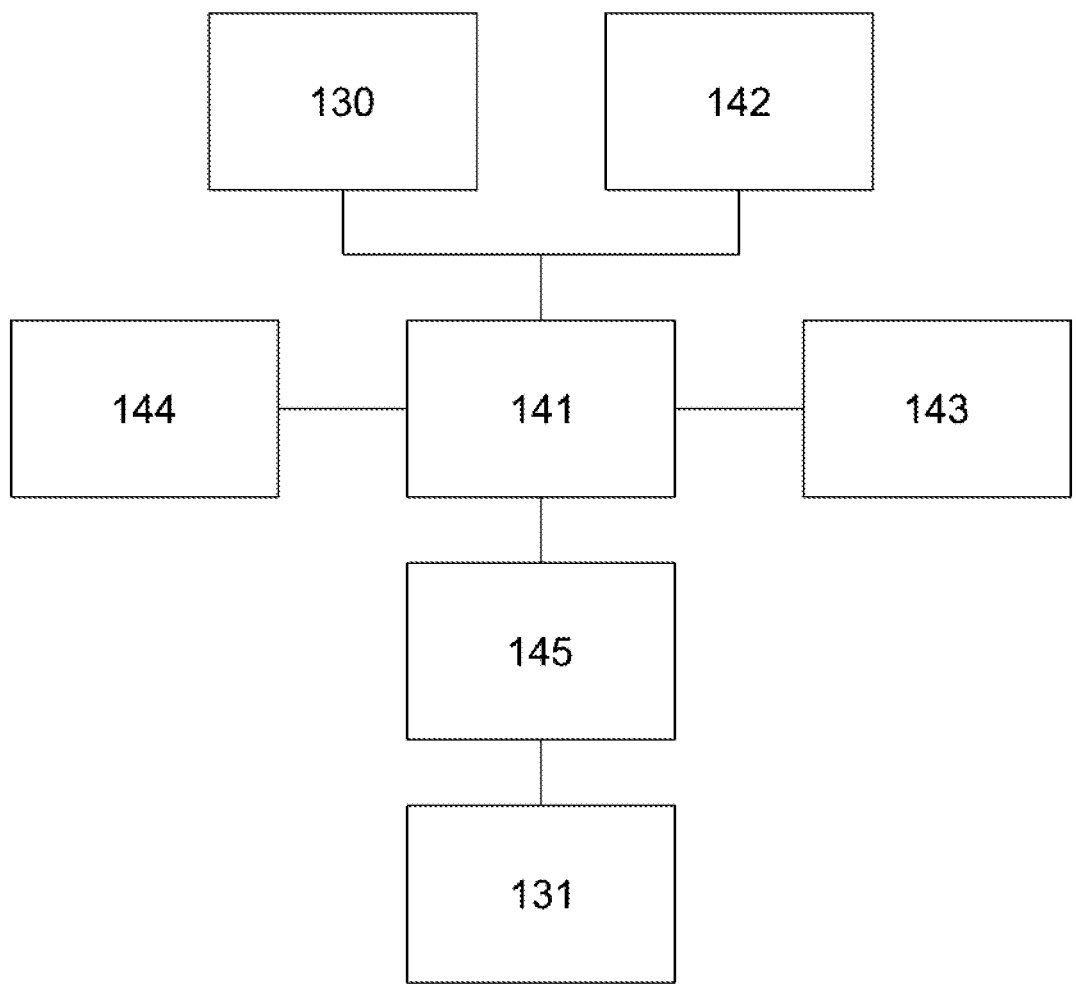
FIG. 11 is a schematic view of a portion of the lighting device illustrated in FIG. 1A.

Referring to FIGS. 8 and 10, the circuitry 140 may include the driver circuit 141, the microcontroller 142, the communication device 143, and/or the traffic sensor 144. The circuitry 140 may be electrically coupled to the first and second light source 127, 128, the ambient sensor 130, the power generating element 131, the photovoltaic device 132, and/or the battery 145. Further, those skilled in the art will readily appreciate that the driver circuit 141, the microcontroller 142, the communication device 143, the traffic sensor 144, the battery 145, and/or the external power source may be electrically coupled to one another in any number of combinations.

Referring to FIGS. 1-9, the first and second opposing sidewalls 114, 115 may extend between the proximal face 112 and the distal face 113 and may extend downwardly from the top surface 111. The first primary optic 120 may be carried by the housing 110 adjacent the first sidewall 114 and may define a first optical chamber 122. The first light source 127 may be positioned within the first optical chamber 122 and may be carried by the housing 110 adjacent the first sidewall 114. The second primary optic 121 may be carried by the housing 110 adjacent the second sidewall 115 and may define a second optical chamber 123. The second light source 128 may be positioned within the second optical chamber 123 and may be carried by the housing 110 adjacent the second sidewall 115. The first optical chamber 122 and/or the second optical chamber 123 may include a reflective layer. The reflective layer may be a color-converting reflective layer. The first primary optic 120 and/or the second primary optic 121 may include a color-converting layer. The first secondary optic 124 and/or the second secondary optic 125 may include a color-converting layer. Further, the first and second secondary optics 124, 125, the ambient light sensor 130, and the power generating element 131 may be carried by the housing 110.

The first and second primary optics 120, 121 and/or the first and second secondary optics 124, 125 may interact with light emitted by the first and second light sources 127, 128 to refract, reflect, collimate, diffuse, direct, and/or otherwise redirect incident light. Accordingly, the first and second light sources 127, 128 may be disposed such that light emitted therefrom is incident upon the first and second primary optics 120, 121 and/or the first and second secondary optics 124, 125. The first and second primary optics 120, 121 and/or the first and second secondary optics 124, 125 may be formed in any shape to impart a desired refraction. In the present alternative embodiment, the first and second primary optics 120, 121 may be a first and second prismatic lens. The first and second prismatic lens may have a generally flat, but prismatic geometry. Additionally, in the present alternative embodiment, the first and second secondary optics 124, 125 have a generally flat geometry. The use of a prismatic lens advantageously allows for light that is emitted from the light source to be directed in any number of directions.

In the present alternative embodiment, the first secondary optic 124 may be carried by the housing 110 and positioned such that the first primary optic 120 is intermediate the first secondary optic 124 and the first light source 127. Additionally, the second secondary optic 125 may be carried by the housing 110 and positioned such that the second primary optic 121 is intermediate the second secondary optic 125 and the second light source 128. The first and second prismatic lenses may further include a color conversion layer which may be configured to receive a source light within a source light wavelength range from the first and/or second light source 127, 128 and to emit a converted light within a converted wavelength range. The first and second secondary optics 124, 125 may further include a color conversion layer which may be configured to receive a source light within a source light wavelength range from the first and/or second light source 127, 128 and to emit a converted light within a converted wavelength range.

Furthermore, the lighting device 100 may include multiple optics. The first and second primary optics 120, 121 and/or the first and second secondary optics 124, 125 may be formed of any transparent, translucent, or substantially translucent material that comports with the desired refraction including, but not limited to, glass, fluorite, and polymers, such as polycarbonate. Types of glass include, without limitation, fused quartz, soda-lime glass, lead glass, flint glass, fluoride glass, aluminosilicates, phosphate glass, borate glass, and chalcogenide glass.

Figure 2A:
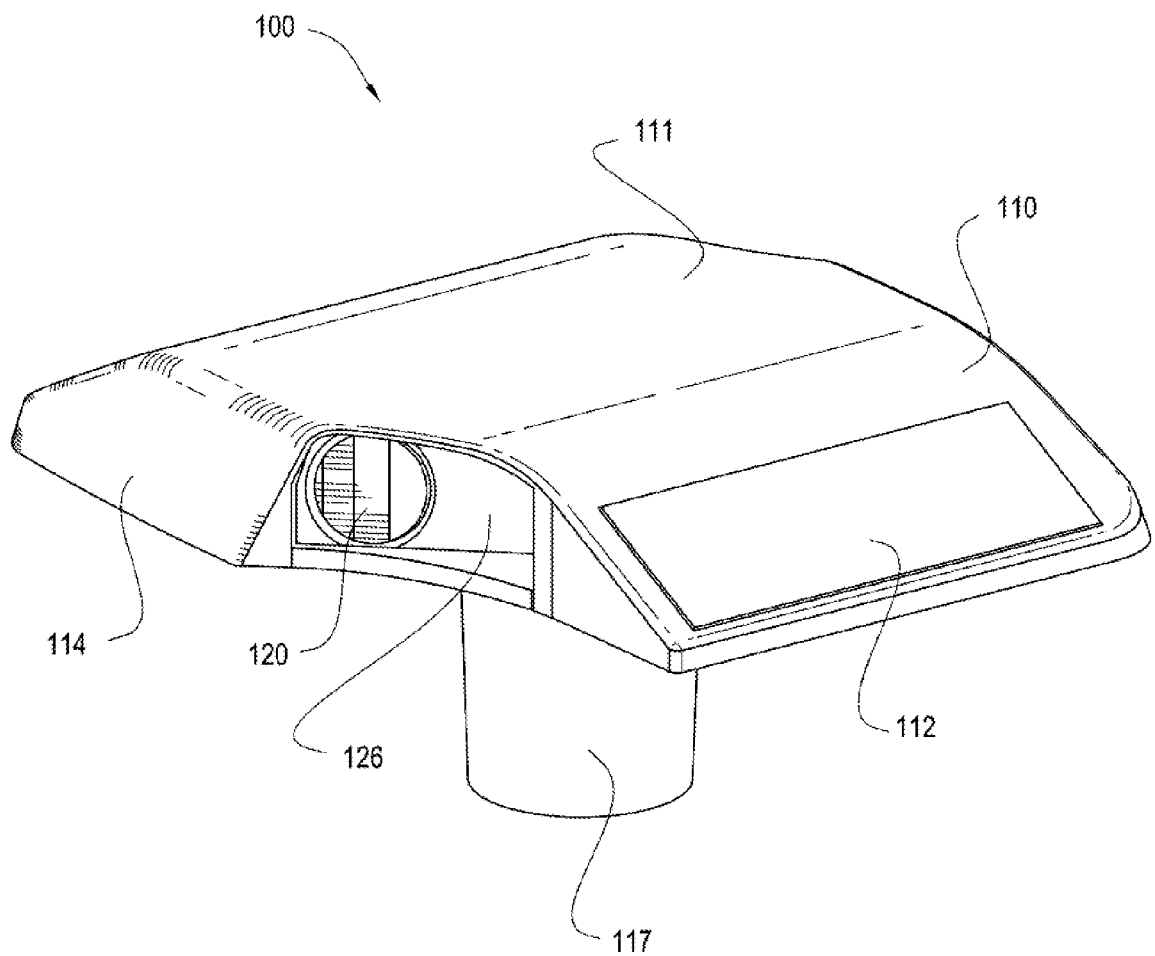
FIG. 2A is a right side perspective view of a portion of the lighting device illustrated in FIG. 1A.
Figure 2B:
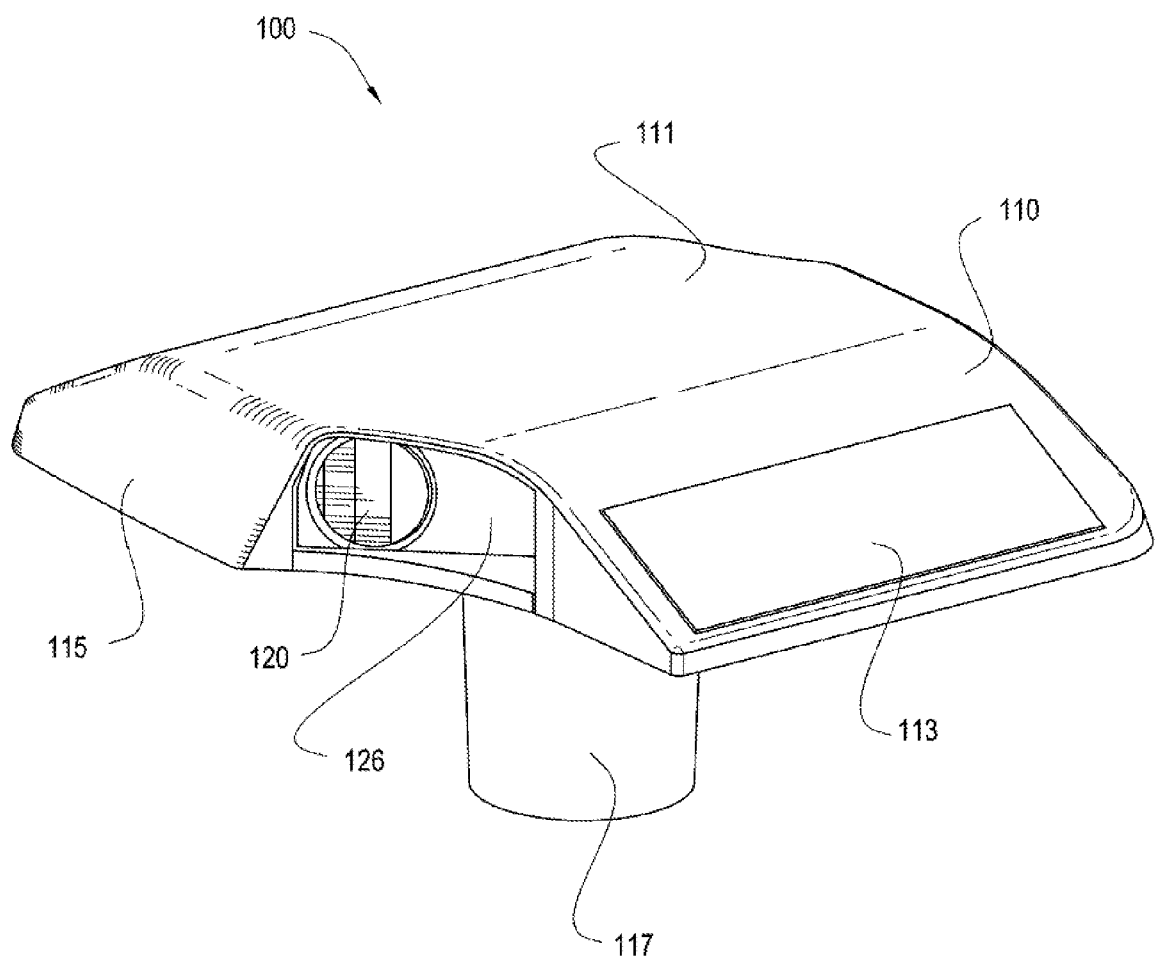
FIG. 2B is a left side perspective view of a portion of the lighting device illustrated in FIG. 1A.

Referring to FIGS. 2A and 2B, the reflective layer 126 may reflect light incident within the first and second optical chambers. More specifically, the reflective layer 126 is illustratively applied to sidewall portions of each of the first and second optical chambers so as to reflect light emitted from the light source and that is incident upon the sidewalls of the first and second optical chambers. The reflective layer 126 is preferably applied to the sidewalls of each of the first and second optical chambers that are exterior to the respective first and second primary optics 120, 121. The reflective layer 126 preferably has a reflection coefficient of at least about 0.1. Those skilled in the art will appreciate, however, that the measurement of the amplitude of the reflected waves versus the amplitude of the incident waves may be shown by the reflection coefficient which may also be anywhere between 0.10 and about 1. In one embodiment, the reflective layer 126 may act as a substrate and have a layer of reflective paint applied thereto. The reflective paint may advantageously enhance illumination provided by the first light source 127 and/or the second light source 128 by causing enhanced reflection of the light prior to reaching the first secondary optic 124 and/or the second secondary optic 125. In another embodiment, the reflective layer 126 may have a reflective liner applied thereto. Similarly, the reflective liner may be readily provided by any type of reflective liner which may be known in the art.

Referring now to FIGS. 1-8, the first and second primary optics 120, 121 and/or the first and second secondary optics 124, 125 may attach to either the housing 110, the first and second opposing sidewalls 114, 115, and/or the first and second optical chambers 122, 123. Specifically, the first and second primary optics 120, 121 and the first and second secondary optics 124, 125 may form an interference fit with the housing 110, the first and second opposing sidewalls 114, 115, and/or the first and second optical chambers 122, 123. The interference fit preferably provides sufficient strength to carry the first and second primary optics 120, 121 and/or the first and second secondary optics 124, 125. Optionally, the first and second primary optics 120, 121 and/or the first and second secondary optics 124, 125 may be attached to the housing 110, the first and second opposing sidewalls 114, 115, and/or the first and second optical chambers 122, 123 through the use of glue, adhesives, fasteners, screws, bolts, welding, or any other means known in the art.

In the present embodiment, the first sidewall 114 may comprise a first slanted section 118. An axis of the first slanted section 118 may be skew to a longitudinal axis of the lighting device 100. The first primary optic 120 may be configured to direct light outward and in a direction away from the first sidewall 114 and/or the first slanted section 118. The light emitted may be directed so that it is angled at least one degree away from the direction of oncoming traffic. This advantageously provides enhanced illumination on the thoroughfare surface that does not have any effect on a user of the thoroughfare surface. For example, if the lighting device 100 is to be used in connection with a roadway, the lighting device may be positioned on the roadway in a manner so that light emitted from the lighting device may be directed angled away from oncoming traffic. In other words, the angle of emission of the light is configured so that a driver of a vehicle in oncoming traffic is not blinded, or otherwise affected, by the light emitted from the lighting device 100.

Although it is disclosed above that the angle of emission of the light is at least one degree away from the direction of oncoming traffic, those skilled in the art will appreciate that the angle of emission of the light may preferably be between about 10 degrees and 30 degrees away from the direction of oncoming traffic. Those skilled in the art will also appreciate that the angle of emission of light may be any angle while still accomplishing the goals, features and advantages of the present invention. Further, those skilled in the art will appreciate that the angle of emission of the light is not limited to being angled away from oncoming traffic, but angled away from any use of any thoroughfare surface.

In the embodiments of the present invention, those skilled in the art will appreciate that the embodiments may be used for different purposes. For example, the lighting device 100, as illustrated in FIGS. 1-8, may be positioned along a center line of a two directional roadway. This may enable traffic to travel in both directions of the roadway and may avoid light being emitted into oncoming vehicles or traffic, thereby lighting the roadway surface and preventing drivers from being blinded by the lighting device 100.

Although not illustrated, as an additional example of an embodiment of the present invention, those skilled in the art will appreciate that the lighting device 100 may be positioned in between lanes of a roadway with traffic traveling in the same direction. This may enable traffic to travel in the same direction on the roadway and may avoid light being emitted into oncoming vehicles or traffic, thereby lighting the roadway surface and preventing drivers from being blinded by the lighting device 100.

As yet another example of an embodiment of the present invention, those skilled in the art will appreciate that the lighting device 100 may be configured in reverse so that the lighting device 100 may be positioned on thoroughfare surfaces as described herein for traffic patterns involving traffic moving forward on the left side of a road, such as in Great Britain, South Africa, and Australia.

In still another example of an embodiment of the present invention, those skilled in the art will appreciate that the lighting device 100 may be configured to emit light to illuminate structures, such as curbs and drainage structures. The lighting device 100 may be positioned on a thoroughfare surface, such as a curb, drainage structure, or other similar object. For example, the second sidewall 115 may not contain the second primary optic 121, the second optical chamber 125, or the second light source 128.

Those skilled in the art will further appreciate that the emission of light from at or about the thoroughfare surface may allow the first and second light sources 127, 128 to be smaller luminaires than overhead lighting devices may otherwise require. The energy required to power the lighting device 100 may also be diminished in comparison to overhead lighting devices. The absorption of light emitted from overhead lighting devices may be about greater than 50 percent and about 80 percent of the light emitted. The lighting device 100 may have less than 50 percent light absorption due to the low angle at which light may be emitted from the first and second light sources 127, 128 relative to the thoroughfare surface(s). The angle at which the light may be emitted from the first and second light sources 127, 128 relative to the thoroughfare surface(s) may be about slightly less than parallel with the thoroughfare surface in a downward direction and may be upwards as much as about 90 degrees or about perpendicular from the thoroughfare surface. The light absorbed by the thoroughfare surface may be about 1 percent to about 100 percent, but those skilled in the art will appreciate that the amount of light emitted by the first and second light sources 127, 128 that is absorbed by the thoroughfare surface may preferably be between about 10 percent and 50 percent.

In the present embodiment, the second sidewall 115 may comprise a second slanted section 119. An axis of the second slanted section 119 may be skew to a longitudinal axis of the lighting device 100. The second primary optic 121 may be configured to direct light outward and in a direction away from the second sidewall 115 and/or the second slanted section 119. The light emitted may be directed so that it is angled at least one degree away from the direction of oncoming traffic.

Light emitted from the first light source 127 may be directed through the first primary optic 120 within a range from about parallel to the longitudinal axis of the lighting device 100 in the direction of the distal face to about perpendicular to the longitudinal axis of the lighting device 100. Those skilled in the art will readily appreciate that light emitted from the first light source 127 may be directed in any number of angles, directions, or combinations within the range described herein, and that the range described above is exemplary, and not meant to be limiting in any way.

Light emitted from the first light source 127 may be directed through the first primary optic 120 within a range from about parallel to a face of the first primary optic 120 in the direction of the proximal face 112 or the distal face 113 to skew from the face of the first primary optic 120 to about perpendicular to the face of the first primary optic 120.

Light emitted from the second light source 128 may be directed through the second primary optic 121 within a range from about parallel to the longitudinal axis of the lighting device 100 in the direction of the proximal face or the distal face to about perpendicular to the longitudinal axis of the lighting device 100. Those skilled in the art will readily appreciate that light emitted from the second light source 128 may be directed in any number of angles, directions, or combinations within the range described herein, and that the range described above is an exemplary configuration, and not meant to be limiting in any way.

Light emitted from the second light source 128 may be directed through the second primary optic 121 within a range from about parallel to a face of the second primary optic 121 in the direction of the proximal face 112 or the distal face 113 to skew from the face of the second primary optic 121 to about perpendicular to the face of the second primary optic 121.

Referring to FIGS. 2A and 2B, the first and second primary optics 120, 121 and/or the first and second secondary optics 124, 125 may be prismatic optics and may refract light substantially about the first and second light sources 127, 128, resulting in approximately omni-directional and uniform light distribution. FIG. 2A depicts one side of the lighting device 100 according to an embodiment of the present invention, while FIG. 2B depicts an opposing side of the lighting device 100 according to an embodiment of the present invention. Those skilled in the art will appreciate that, as is evident in the FIGS. 2A and 2B, this embodiment of the lighting device 100 according to the present invention is somewhat symmetrical in nature. The first and second primary optics 120, 121 and/or the first and second secondary optics 124, 125 may include inner surfaces that may include a plurality of generally vertical segments and a plurality of generally horizontal segments. Each of the generally vertical segments may have two ends and may be attached at each end to a generally horizontal segment, thereby forming a plurality of prismatic surfaces. It is not a requirement of the invention that the generally vertical segments be perfectly vertical, nor is it a requirement that the generally horizontal segments be perfectly horizontal. Similarly, it is not a requirement of the invention that the generally vertical segments be perpendicular to the generally horizontal segments. Each of the prismatic surfaces may be smooth, having a generally low surface tolerance. Moreover, each of the prismatic surfaces may be curved, forming a diameter of the inner surfaces.

The variance of the generally vertical segments from vertical may be controlled and configured to desirously refract light. Similarly, the variance of the generally horizontal segments from horizontal may be controlled and configured to produce prismatic surfaces that desirously refract light. Accordingly, the prismatic surfaces may desirously refract light outward from the lighting device 100 and may be configured to selectively refract light within desired ranges about the lighting device 100 as described herein. Additional details relating to prismatic optics incorporated into a lighting device are provided in U.S. patent application Ser. No. 13/739,054 titled Luminaire with Prismatic Optic filed Jan. 11, 2013 which, in turn, claims the benefit under 35 U.S.C. §119(e) of U.S. Provisional Patent Application Ser. No. 61/642,205 titled Luminaire with Prismatic Optic filed May 3, 2012, the entire contents of each of which are incorporated by reference.

Figure 1B:
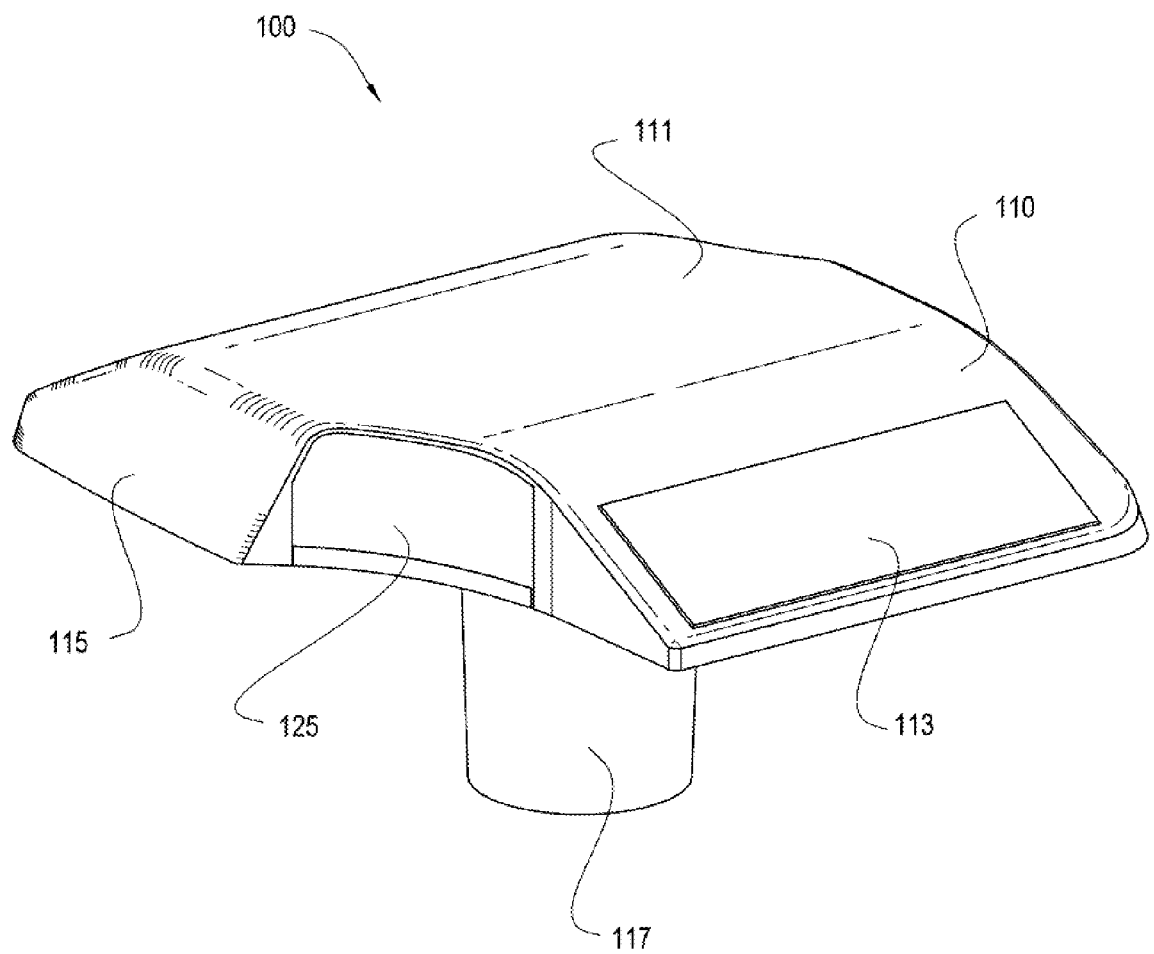
FIG. 1B is left side perspective view of the lighting device illustrated in FIG. 1A.
Figure 3A:
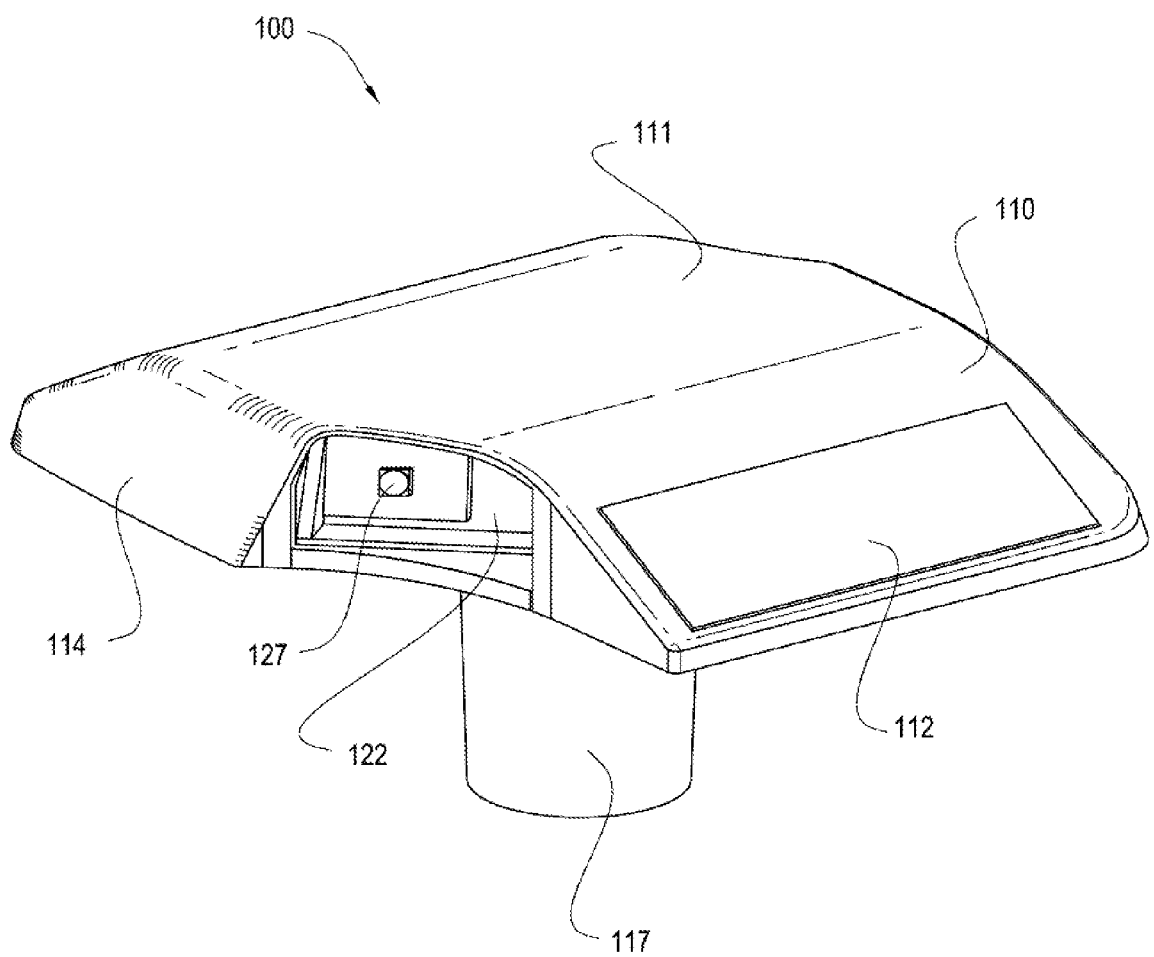
FIG. 3A is a right side perspective view of a portion of the lighting device illustrated in FIG. 1A.
Figure 3B:
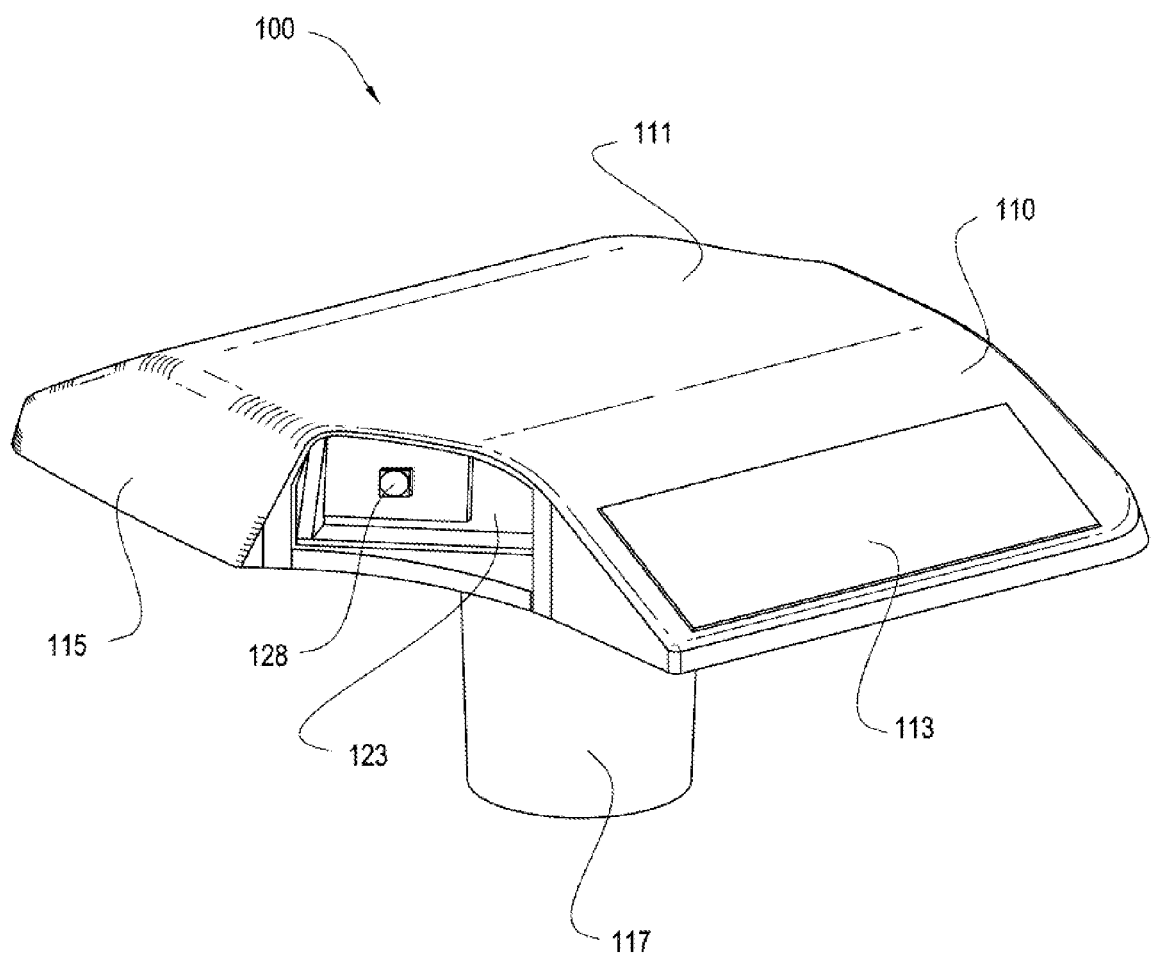
FIG. 3B is a left side perspective view of a portion of the lighting device illustrated in FIG. 1A.
Figure 4:
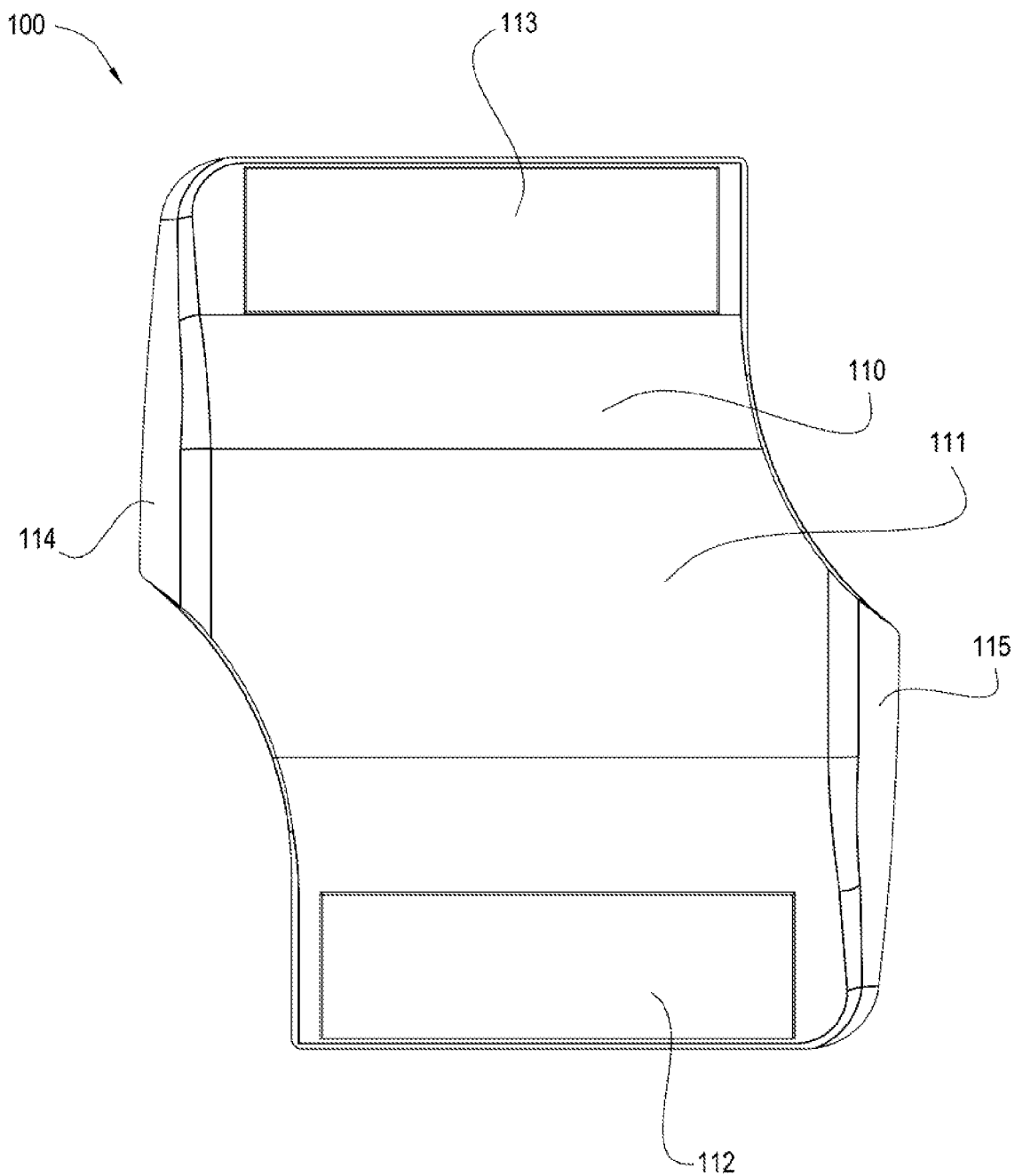
FIG. 4 is a top plan view of the lighting device illustrated in FIG. 1A.
Figure 5:
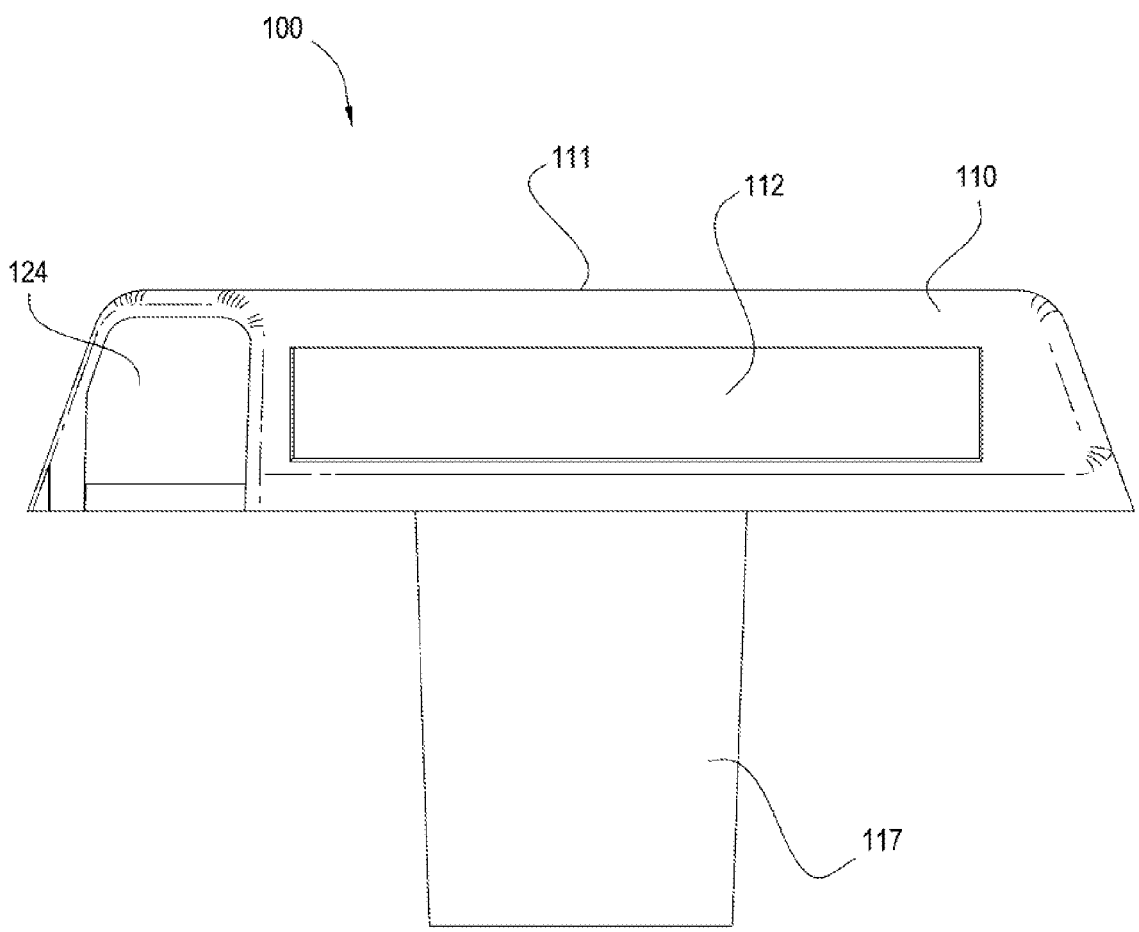
FIG. 5 is a front elevation view of the lighting device illustrated in FIG. 1A.

Referring to FIGS. 1A, 1B, 3A, and 3B, similar to the description above of FIGS. 2A and 2B, FIG. 1A depicts one side of the lighting device 100 according to an embodiment of the present invention, while FIG. 1B depicts an opposing side of the lighting device 100 according to an embodiment of the present invention. Additionally, FIG. 3A depicts one side of the lighting device 100 according to an embodiment of the present invention, while FIG. 3B depicts an opposing side of the lighting device 100 according to an embodiment of the present invention. Those skilled in the art will appreciate that, as is evident in the FIGS. 1A and 1B, as well as FIGS. 3A and 3B, this embodiment of the lighting device 100 according to the present invention is somewhat symmetrical in nature.

Referring again to FIGS. 1-8, in order to maintain a fluid seal between the first and second primary optics 120, 121 and the first and second optical chambers 122, 123, and/or the environment external to the lighting device 100, the first and second primary optics 120, 121 may further include a sealing member. The sealing member may include any device or material that can provide a fluid seal as described above. For example, and without limitation, the sealing member may form a fluid seal between the first and second primary optics 120, 121 and the housing 110. In order to maintain a fluid seal between the first and second secondary optics 124, 125 and the environment external to the lighting device 100, the first and second secondary optics 124, 125 may further include a sealing member. The sealing member may include any device or material that can provide a fluid seal as described above. For example, and without limitation, the sealing member may form a fluid seal between the first and second secondary optics 124, 125 and the housing 110.

The first and second light sources 127, 128 may include any device capable of emitting light. The first and second light sources 127, 128 may, for example and without limitation, include incandescent lights, halogens, fluorescents (including compact-fluorescents), high-intensity discharges, light emitting semiconductors, such as light-emitting diodes (LEDs), lasers, and any other light-emitting device known in the art. In some embodiments of the present invention, the first and second light sources 127, 128 are each an LED package. In some further embodiments, the LED package may include a plurality of LEDs and a circuit board.

Additionally, in some embodiments, where the LED package includes a plurality of LEDs, the LED package may include a first set of LEDs that emit light within a wavelength range corresponding to a first color, and a second set of LEDs that emit light within a wavelength range corresponding to a second color. The first set of LEDs may be configured to emit light that is intended primarily to illuminate. As such, the first set of LEDs may emit light that is generally white in color. The second set of LEDs may be configured to emit light that is intended primarily to communicate with an observer. More specifically, the second set of LEDs may be configured to emit light having a color that may be interpreted by an observer to have an indication of something to the observer.

In the present embodiment of a thoroughfare lighting device, the second set of LEDs may be configured to emit light that communicates a status of the condition of the thoroughfare in the direction of travel an observer may be anticipated to be traveling. For example, the second set of LEDs may be configured to emit a red light, which is commonly understood to indicate that the observer should be prepared to stop at some distance ahead on the thoroughfare. In another example, the second set of LEDs may be configured to emit a yellow or amber light, which is commonly understood to indicate that the observer should be prepared to slow at some distance ahead on the thoroughfare. In another example, the second set of LEDs may be configured to emit a blue light, which is commonly understood to indicate the presence or imminent arrival of an emergency vehicle.

Moreover, where the lighting device 100 or a system of lighting devices 100 is configured to selectively illuminate two or more lanes having the same direction of travel individually, the individual lane in which an emergency vehicle is currently travelling or is anticipated to travel in may have a blue light shown thereon, so as to indicate to an observer that they should avoid occupying that lane, and if already so occupying, to vacate that lane.

It is contemplated and included with the scope of the invention that the LED package may comprise any number of sets of LEDs, including sets of one, with each set being configured to emit light within wavelength ranges corresponding alternatively to a color intended primarily for illumination or to a color that conveys meaning to an observer, including three or more sets. Furthermore, it is contemplated and included within the scope of the invention that any color of light, and any LED capable of emitting light of such a color, may be included in the LED package, and that information apart from that related to the condition of thoroughfare may be communicated by the colored LEDs of the LED package.

Additionally, it is contemplated and included within the scope of the invention that the various sets of LEDs may be operated in such a manner so as to catch the attention of an observer and/or communication additional meaning to an observer. For example, the sets of LEDs may be flashed. Moreover, two or more sets of LEDs of differing colors may be alternately flashed. Additionally, sets of LEDs that emit colored light may be operated concurrently with LEDs configured to primarily emit illuminating light, or alternately.

Additionally, in another embodiment, the microcontroller 142 may operate the LEDs so as to communicate via visible light communication. More specifically, the microcontroller 142 may alternately turn on and off the LEDs of the LED package so as to communicate information to a receiving device complying with visible light communication standards. The LEDs may be turned on and off at a frequency such that it is imperceptible to an observer, thus preventing any potential flicker. The light emitted by the LEDs may be sensed by an optical sensor associated with an observer. For example, the observer may be a driver operating an automobile having a computerized device that includes an optical sensor, the automobile travelling in the direction of travel of the thoroughfare. When the microcontroller 142 operates the LEDs to communicate via visible light communication, the optical sensor may transmit the visible light signal observed, which may then be interpreted by the computerized device of the automobile to convey meaning, such as information regarding that status of the condition of the thoroughfare upon which the automobile is travelling. The computerized device of the automobile may then communicate the interpreted information to the driver by any suitable means, including utilizing an audio system of the automobile to produce an audio signal that the driver may understand, such as a warning sound or speech. Additionally, if the automobile includes a visual display device, the interpreted information may be presented on the display device.

Furthermore, those skilled in the art will readily appreciate that additional embodiments with different configurations, including opposite configurations, are described herein, and the configurations above are exemplary, and not meant to be limiting in any way.

Although it is preferable for the light from the first and second light sources 127, 128 to be emitted in a generally outward direction along adjoining surfaces, i.e., in a direction opposite the opposing sidewall and perpendicular to the face of the first and second primary optics 120, 121, those skilled in the art will appreciate that the light may shine outwardly from the first and second light sources 127, 128 in any direction through various openings and optics. This may advantageously allow for the lighting device 100 according to embodiments of the present invention to provide various lighting effects that may be desirable to a user.

Referring now to FIGS. 8 and 10, the ambient light sensor 130 may be a photodiode device, a phototransistor device, a photovoltaic device, or a photomultiplier device. The power generating device 131 may be a photovoltaic device, piezoelectric device, or a thermoelectric device. The ambient light sensor 130 may be configured to dim the first and second light sources 127, 128. Further, the first and second light sources 127, 128 may also be configured to turn on or off depending on the amount of traffic or as desired by a user.

The driver circuit 141 may be electrically coupled to the power generating element 131, the first and second light sources 127, 128, the circuitry 140, the microcontroller 142, and/or the battery 145. The battery 145 may be electrically coupled to the power generating element 131, the photovoltaic device 132, the circuitry 140, the driver circuit 141, the microcontroller 142, the communication device 143, and/or the traffic sensor 144. Those skilled in the art will recognize that any of these components may be electrically coupled to each other in any combination known in the art. The power generating element 131 and/or the photovoltaic device 132 may produce electrical power that may be stored by the battery 145. The first and second light sources 127, 128 and/or the microcontroller 142 may operate using electrical power that may be drawn from the circuitry 140, the driver circuit 141, and/or the battery 145. Additionally, the external power source may be electrically coupled to the power generating element 131, the photovoltaic device 132, the circuitry 140, the driver circuit 141, the microcontroller 142, the communication device 143, and/or the traffic sensor 144, and the battery 145. For example and without limitation, the external power source may be an electrical line provided below the thoroughfare surface or through the ground and may be electrically coupled to the driver circuit 141 through the post 117.

The traffic sensor 144 may generate data regarding traffic in the environment that may be surrounding the lighting device 100. The communication device 143 may transmit the data generated by the traffic sensor 144 across a network. The communication device 143 may be a wireless communication device. The communication device 143 may be a radio device, a computer network device, a visible light device, an acoustic device, or any other device known in the art that provides wireless communication. Those skilled in the art will appreciate that a communication device 143 being incorporated into the lighting device 100 advantageously allows for the lighting device 100 to be remotely operated and/or monitored, if so desired by a user. Those skilled in the art will further appreciate that the communication device 143 also advantageously allows for the lighting device 100 to communicate data through a remote connection, such as the network, if so desired by a user. Additional details relating to communication devices incorporated into a lighting device are provided in U.S. patent application Ser. No. 12/145,634 titled Configurable Environmental Condition Sensing Luminaire System and Associated Methods filed on Feb. 23, 2012, which, in turn, claims the benefit of U.S. Provisional Patent Application Ser. No. 61/486,316 titled Motion Detecting Security Light and Associated Methods filed on May 15, 2011, as well as U.S. Provisional Patent Application Ser. No. 61/486,314 titled Wireless Lighting Device and Associated Methods filed on May 15, 2011, and U.S. Provisional Patent Application Ser. No. 61/486,322 titled Variable Load Power Supply filed on May 15, 2011, the entire contents of each of which are incorporated by reference.

Where the lighting device 100 includes a traffic sensor 144, the lighting device may operate 100 either the first or second light sources 127, 128 so as to communicate information regarding the data generated by the traffic sensor 144 to an observer as described hereinabove. For example, where the traffic sensor 144 generates data indicating a level of traffic resulting in a slow-down in travel along the thoroughfare, either of the first and second light sources 127, 128 may be operated to emit a yellow or amber light, warning observers travelling on the thoroughfare of the slow-down. More information regarding the determination of traffic patterns may be found in U.S. patent application Ser. No. 13/465,921 incorporated by reference hereinabove.

Furthermore, in some embodiments, where the lighting device 100 includes a communication device 143, the microcontroller 142 may be configured to operate either of the first and second light sources 127, 128 to emit a colored light configured to communicate meaning to an observer responsive to information received by the communication device 143. For example, the communication device 143 may receive information indicating a slow-down on the thoroughfare ahead of the lighting device 100 in the direction of travel. Upon receiving such information, the microcontroller 142 may operate at least one of the first and second light sources 127, 128 to emit yellow or amber colored light as described hereinabove. Similarly, where the communication device 143 receives information indicating a stop on the thoroughfare ahead of the lighting device 100 in the direction of travel, the microcontroller 142 may operate at least one of the first and second light sources 127, 128 to emit red colored light as described hereinabove. Additionally, where the communication device 143 receives information indicating the presence of an emergency vehicle or the anticipated arrival of such, the microcontroller 142 may operate at least one of the first and second light sources 127, 128 to emit blue colored light as described hereinabove. Furthermore, where there is a network of lighting devices 100 along a thoroughfare having two or more lanes in a direction of travel, each of the lighting devices 100 may receive information causing each of the microcontrollers 142 to operate at least one of the first and second light source 127, 128 so as to emit blue light onto the lane in which an emergency vehicle is anticipated to be travelling, as described hereinabove.

In another embodiment of the lighting device 100 that includes a traffic sensor 144, it is contemplated that the microcontroller may be configured to transmit a signal to a traffic monitoring location, such as a typical Department of Transportation monitoring center, to carry out various operations. For example, the traffic data that is sensed by the traffic sensor 144 may be communicated to the DOT monitoring center to operate warning signs that may be a long distance away, i.e., a warning sign signaling motorists that there is heavy traffic five miles ahead, or a warning sign that suggests alternate routes to motorists based on information received from the traffic sensors. Further, those skilled in the art will appreciate that the information collected by the traffic sensors can be readily stored, and that this information can then be used to perform various traffic studies, thereby eliminating the need for manual labor to install various traffic signals and to monitor traffic patterns.

Referring to FIGS. 1-8, the first and second opposing sidewalls 114, 115 may include first and second slanted sections 118, 119, respectively. The first and second slanted sections 118, 119 may be curved, slanted, partially curved, and/or partially slanted. For example, the first sidewall 114 may extend straight from the proximal face 112 toward the distal face 113 parallel with the longitudinal axis of the lighting device 100, then an axis of the first slanted section 118 may be skew to a longitudinal axis of the lighting device 100, then after a distance of the first slanted section 118, the first sidewall 114 may return to the original straight direction toward the distal face 113.

The first and second opposing sidewalls 114, 115 may be curved, slanted, partially curved, and/or partially slanted. For example, the first sidewall 114 may extend straight from the proximal face 112 toward the distal face 113, then taper in a direction toward the second sidewall 115, then reverse direction at the same angle to extend directly straight again toward the distal face 113.

The reflective member 150 may be positioned on the proximal face 112 and/or the distal face 113. As perhaps best illustrated in FIG. 6, the heat sink 160 may be carried by the housing 110 and may include a plurality of fins 161. Those skilled in the art will appreciate that there may be any number of fins 161 which may be positioned on any number of surfaces of the housing 110, including the top surface 111, the proximal face 112, the distal face 113, the first and second opposing sidewalls 114, 115, and/or the heat sink 160. In the present alternative embodiment, the bottom member 116 may include the heat sink 160. In other embodiments, the post 117 may include the heat sink 160. Additionally, the lighting device 100 may include one or more heat sinks 160. The first and second light sources 127, 128 may emit light which may produce heat. The heat sink 160 may provide surface area to allow heat to travel away from the first and second light sources 127, 128, thereby cooling the first and second light sources 127, 128. Removing heat from the first and second light sources 127, 128 may enhance the life of the first and second light sources 127, 128 and the lighting device 100 in general. For example, the post 117 may be the heat sink 160 and may transfer heat away from the lighting device 100 through the thoroughfare surface, structure, ground, or other similar object.

Figure 6:
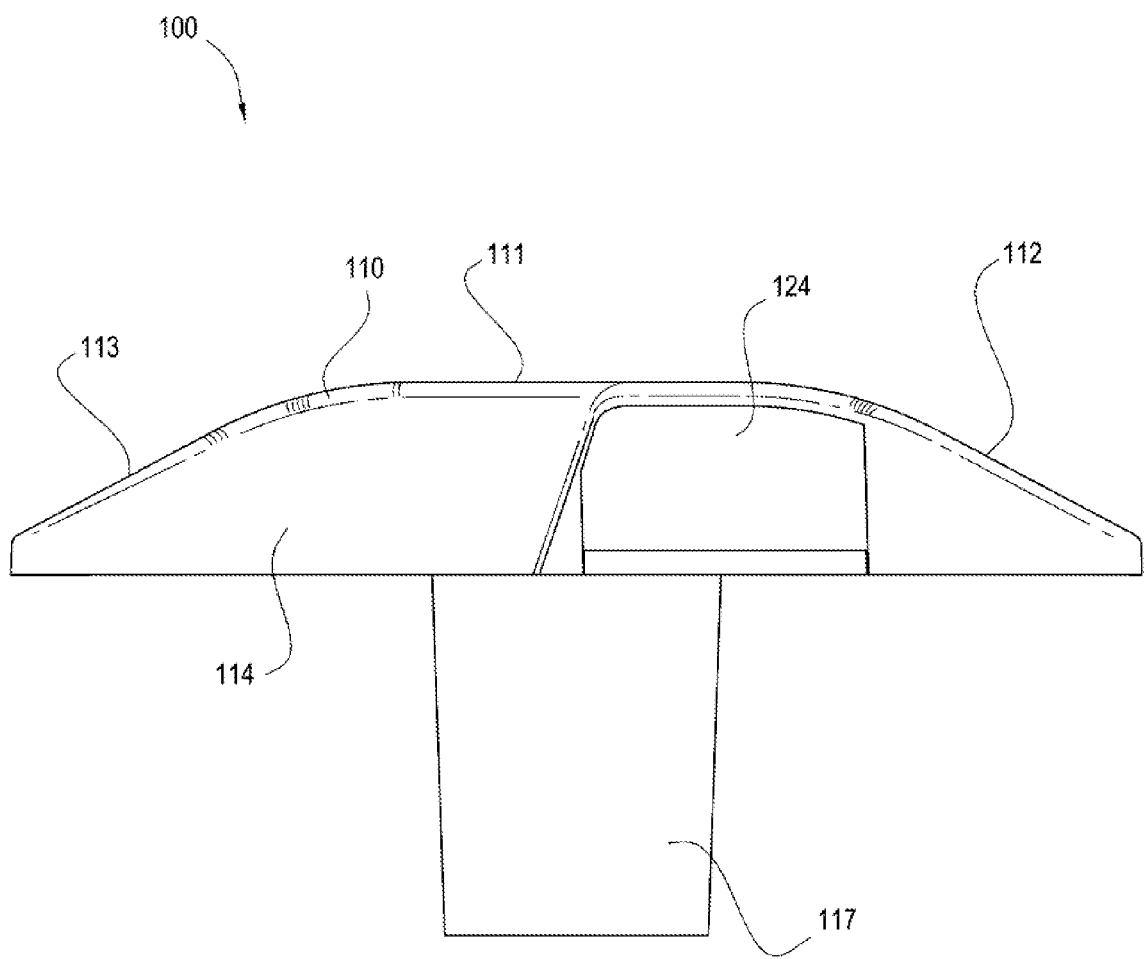
FIG. 6 is a side elevation view of the lighting device illustrated in FIG. 1A.
Figure 7:
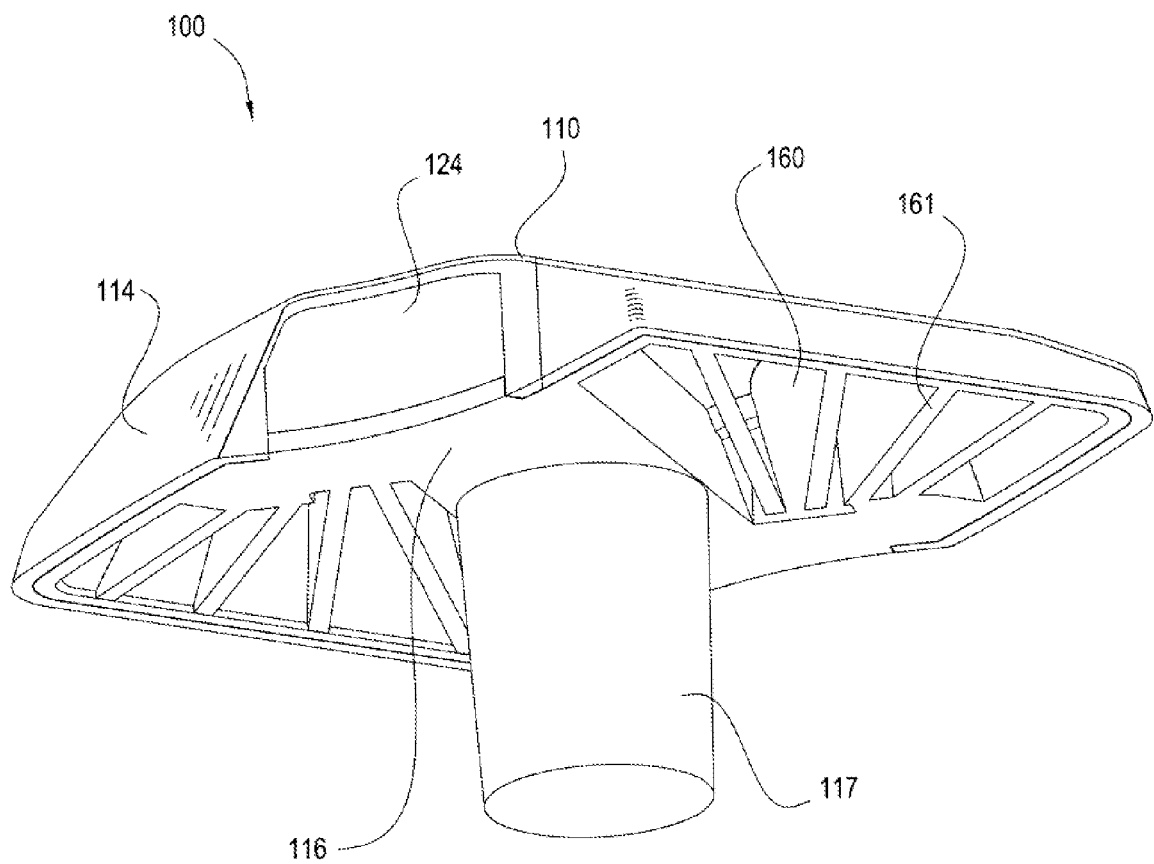
FIG. 7 is a lower perspective view of the lighting device illustrated in FIG. 1A.

Continuing to refer to FIG. 6, the heat sink 160 may be configured to extend substantially the length of the housing 110 and the plurality of fins 161 may be configured to extend substantially the length of the heat sink 160. Those skilled in the art will appreciate that the present invention contemplates the use of the plurality of fins 161 that extend any distance and may project radially outward from the heat sink 160, and that the disclosed heat sink 160 that includes the plurality of fins 161 that extend substantially the length thereof is not meant to be limiting in any way. The plurality of fins 161 may increase the surface area of the heat sink 160 and may permit thermal fluid flow between each fin 161, thereby enhancing the cooling capability of the heat sink 160. The heat sink 160 and/or the plurality of fins 161 may provide support for the housing 110. Additional details and information regarding the cooling function of heat sinks with respect to lighting devices are provided in U.S. Provisional Patent Application Ser. No. 61/715,075 titled Lighting Device with Integrally Molded Cooling System and Associated Methods filed on Oct. 17, 2012.

Referring again to FIGS. 1-8, also for example, and without limitation, the housing 110 and components of the housing 110, including the top surface 111, the proximal face 112, the distal face 113, the first and second opposing sidewalls 114, 115, the bottom member 116, and/or the post 117 may be molded or overmolded, which may be individually and separately, and which may be accomplished by any molding process known in the art, including, but not limited to blow molding, sintering, compression molding, extrusion molding, injection molding, matrix molding, transfer molding, or thermoforming. The housing 110 and components of the housing 110, including the top surface 111, the proximal face 112, the distal face 113, the first and second opposing sidewalls 114, 115, the bottom member 116, and/or the post 117 may be attached by glue, adhesives, fasteners, screws, bolts, welding, or any other means known in the art.

Additionally, and without limitation, the housing 110 and components of the housing 110, including the top surface 111, the proximal face 112, the distal face 113, the first and second opposing sidewalls 114, 115, the bottom member 116, and/or the post 117 may be provided by a material having a thermal conductivity=150 Watts per meter-Kelvin, a material having a thermal conductivity=200 Watts per meter-Kelvin, an aluminum, an aluminum alloy, a magnesium alloy, a metal loaded plastics material, a carbon loaded plastics material, a thermally conducting ceramic material, an aluminum silicon carbide material, a plastic, and/or other similar materials known in the art. Furthermore, the material may be any material that allows the dissipation of heat.

The lighting device 100 may further include a tilting mechanism. The tilting mechanism may be positioned within the housing 110 or the post 117 and may be electrically coupled to the ambient light sensor 130, the power generating element 131, the photovoltaic device 132, the circuitry 140, the driver circuit 141, the microcontroller 142, the communication device 143, the traffic sensor 144, and/or the battery 145.

In another embodiment of the invention, the lighting device 100 may include a housing 110. The housing 110 may include a top surface 111, a proximal face 112, a first sidewall 114, a first optical chamber 122, a photovoltaic device 132, a top inner surface 133, a photovoltaic device chamber 134, and a reflective member 150. The first optical chamber 122 may include the first secondary optic 124, the reflective layer 126, and the first light source 127. Although not illustrated, the housing may further include a distal face 113, a second sidewall 115, and a second optical chamber 123. The second optical chamber 123 may include the second secondary optic 125, the reflective layer 126, and the second light source 128.

The proximal face 112 may be positioned on the reflective member 150. The top surface 111 may include the photovoltaic device chamber 134. The photovoltaic device 132 may be positioned in the photovoltaic chamber 134. Additionally, the photovoltaic device 132 may be tiltable within the photovoltaic device chamber 134. For example, a proximal end of the photovoltaic device 132 may tilt in a downward direction, thereby causing the distal end of the photovoltaic device 132 to tilt in an upward direction. As an additional example, the proximal end of the photovoltaic device 132 may tilt in an upward direction, thereby causing the distal end of the photovoltaic device 132 to tilt in a downward direction. The photovoltaic device 132 may tilt so that the optimal amount of solar energy may be obtained. The lighting device 100 may further include a tilting mechanism. The tilting mechanism may be electrically coupled to the photovoltaic device 132 and may produce the desired tilt in the photovoltaic device 132. Those skilled in the art will appreciate that the embodiments of the present invention may include a photovoltaic device 132 that is stationary or that tilts in any number of directions.

The top inner surface 133 of the photovoltaic device chamber 134 may be positioned above the photovoltaic device 132. In order to maintain a fluid seal between the top inner surface 133 and the environment external to the lighting device 100, the top inner surface 133 may further include a sealing member. The sealing member may include any device or material that can provide a fluid seal as described above. For example, and without limitation, the top inner surface 133 may include the sealing member that may form a fluid seal between the top inner surface 133 and the top surface 111 of the housing 110. The top inner surface 133 may be formed of any transparent, translucent, or substantially translucent material that comports with the desired refraction including, but not limited to, glass, fluorite, and polymers, such as polycarbonate. Types of glass include, without limitation, fused quartz, soda-lime glass, lead glass, flint glass, fluoride glass, aluminosilicates, phosphate glass, borate glass, and chalcogenide glass.

Figure 9:
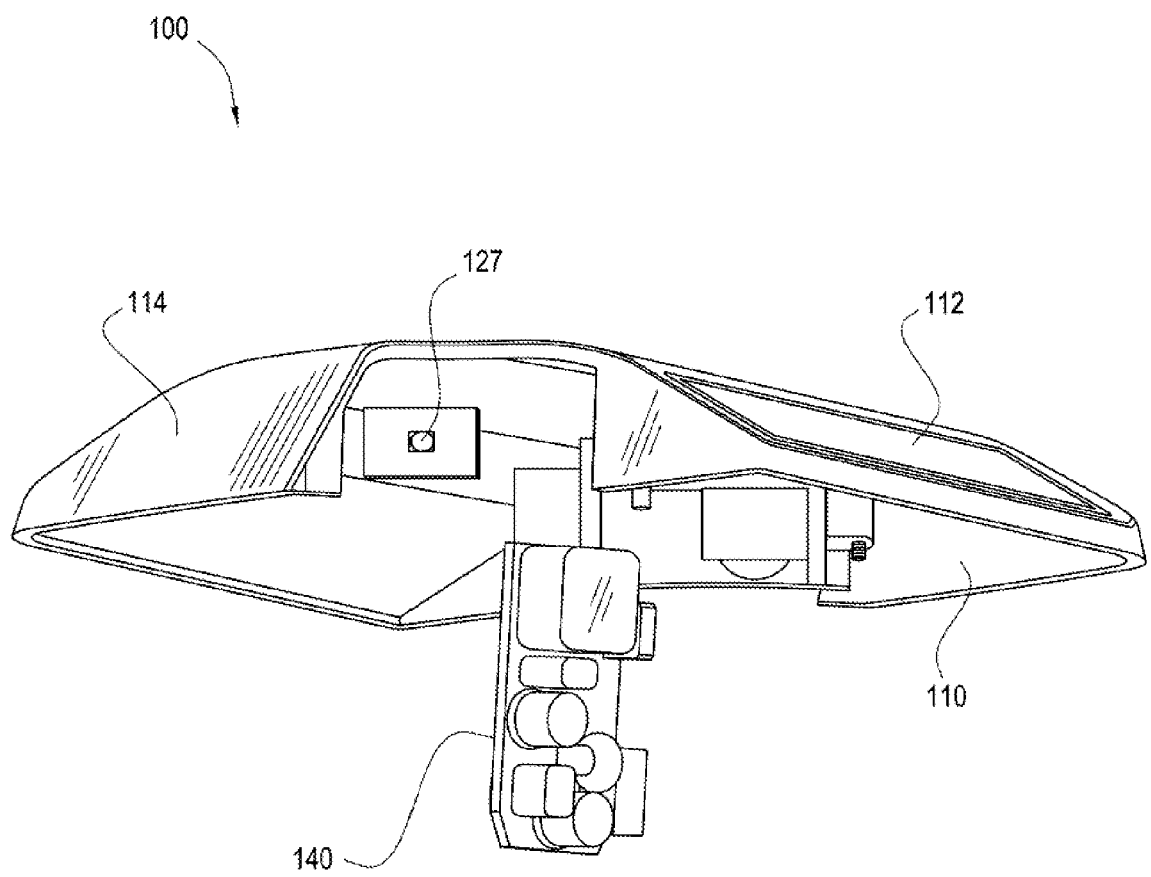
FIG. 9 is a perspective view of the lighting device illustrated in FIG. 1A having portions cut away so as to illustrate an interior portion of the lighting device.

Referring now to FIG. 9, a lighting device 900 according to another embodiment of the invention is presented. The lighting device 900 may comprise a base member 910, a sidewall 920 extending generally upwardly from the base member, and a top section 930. The base member 910 may be configured to be attached to a thoroughfare surface or a surface adjacent to a thoroughfare. Accordingly, the lighting device 900 may be positioned at a distance from the thoroughfare surface.

The top section 930 may comprise an optic 932, a first set of LEDs 934, and a second set of LEDs 936. The first set of LEDs 934 may be configured to emit a generally white light, and the second set of LEDs 936 be configured to emit colored light. In some embodiments, the second set of LEDs 936 may be configured to emit light in a variety of colors. In some embodiments, each of the first and second sets of LEDs 934, 936 may configured to emit light at an angle above or below a plane parallel to a plane defined by the thoroughfare surface. In some embodiments, the first set of LEDs 934 may be configured to emit light at an angle below a plane parallel to a plane defined by the thoroughfare surface, and the second set of LEDs 936 may be configured to emit light approximately parallel to or at an angle above the plane defined by the thoroughfare surface. More specifically, the first set of LEDs 934 may be positioned so as to emit light generally in the direction of the thoroughfare surface and the second set of LEDs 936 may be configured to emit light in a direction so as to be visible by occupants of vehicles travelling along the thoroughfare surface. Additionally, the optic 932 may be configured to cause light emitted by the first and second sets of LEDs 934, 936 to be emitted by the lighting device 900 in desired directions. Furthermore, each of the first and second sets of LEDs 934, 936 may be configured to selectively illuminate individual lanes of the thoroughfare.

The lighting device 900 may further comprise a driver circuit (not shown) configured to control the operation of each of the first and second sets of LEDs 934, 936 and a communication device (not shown) that may be electrically coupled to the driver circuit. The driver circuit may be configured to operate the first set of LEDs 934 so as to illuminate the thoroughfare surface and the second set of LEDs 936 to emit a colored light indicating a condition of the thoroughfare in a direction of travel of the observer. Moreover, in some embodiments, the communication device may be configured to receive information related to a condition of the thoroughfare, as described hereinabove, and the driver circuit may be configured to operate the first and second sets of LEDs responsive to the information received from the communication device. In some embodiments, the driver circuit may be configured to operate the second set of LEDs 936 to indicate a condition of a first lane of the thoroughfare but not indicate a condition of a second lane of the thoroughfare. The condition indicated by the lighting device 900 may be any condition as described hereinabove.

In some embodiments, the lighting device 900 may further comprise a traffic sensor (not shown). The traffic sensor may be electrically coupled to the driver circuit and configured to sense a traffic pattern and generate information regarding traffic on an associated thoroughfare. Furthermore, the driver circuit may be configured to operate at least one of the first and second sets of LEDs 934, 936 responsive to the information generated by the traffic sensor.

Additionally, the light source may emit light at a greater or lesser angle than parallel to a plane defined by the thoroughfare surface. The thoroughfare may be any object or structure that has a surface, particularly those that allow vehicular, air, bicycle, pedestrian, or other traffic. For example, a thoroughfare surface may be a roadway, a bikeway, a walkway, a sidewalk, a pathway, a bridge, a ramp, a tunnel, a curb, a parking lot, a driveway, a roadway barrier, a drainage structure, a utility structure, or any other similar object or structure. Those skilled in the art will appreciate that this terminology is only illustrative and does not affect the scope of the invention.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims.

Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item. Additionally, the term "and" should be construed to include the term "or" if possible as the term "and" is not for purposes of limitation. Thus, the scope of the invention should be determined by the appended claims and their legal equivalents, and not by the examples given.

What is claimed is:

1. A thoroughfare lighting device comprising:
   a housing configured to be attached to a thoroughfare surface;
   wherein the housing comprises a top surface, a proximal face, a distal face, and first and second opposing sidewalls extending between the proximal and distal faces and extending downwardly from the top surface;
wherein the first sidewall tapers in a direction of the distal face;
a plurality of light-emitting diodes (LEDs) configured to selectively illuminate individual lanes of the thoroughfare surface, the plurality of LEDs comprising:
a first set of LEDs configured to emit a generally white light, and
a second set of LEDs configured to emit colored light that is observable by an observer that is operable to selectively emit light so as to illuminate individual lanes of the thoroughfare surface;
a driver circuit electrically coupled to the plurality of LEDs and configured to operate the second set of LEDs to emit a colored light illuminating a single lane of the thoroughfare surface indicating the condition of the individual lane of the thoroughfare surface;
a first optic carried by the first sidewall of the housing and positioned in optical communication with the plurality of LEDs; and
a second optic carried by the second sidewall of the housing;
wherein the plurality of LEDs is divided such that a portion of each of the first and second sets of LEDs are in optical communication with the first optic and another portion of each of the first and second sets of LEDs are al communication with the second optic.

2. The thoroughfare lighting device according to claim 1 wherein the driver circuit is configured to operate the plurality of LEDs to transmit data via visible light communication to another thoroughfare lighting device.

3. The thoroughfare lighting device according to claim 1 wherein the second set of LEDs comprises LEDs configured to emit light having a first color and LEDs configured to emit light having a second color that is different from the first color.

4. The thoroughfare lighting device according to claim 1 wherein the second set of LEDs is configured to emit at least one of blue light, red light, yellow light, and amber light.

5. The thoroughfare lighting device according to claim 1 wherein the driver circuit is configured to operate the second set of LEDs to emit a red light to indicate a stop in traffic; wherein the driver circuit is configured to operate the second set of LEDs to emit a yellow or amber light to indicate a slow-down in traffic; and wherein the driver circuit is configured to operate the second set of LEDs to emit a blue light to indicate the presence or imminent arrival of an emergency vehicle.

6. The thoroughfare lighting device according to claim 1 further comprising a traffic sensor electrically coupled to the driver circuit; wherein the traffic sensor is configured to sense a traffic pattern and generate information regarding traffic on the associated thoroughfare; and wherein the driver circuit is configured to operate the plurality of LEDs responsive to the information generated by the traffic sensor.

7. The thoroughfare lighting device according to claim 1 wherein the driver circuit is configured to alternately flash the first set of LEDs and the second set of LEDs.

8. The thoroughfare lighting device according to claim 1 wherein the second sidewall tapers in the direction of the distal face.

9. The thoroughfare lighting device according to claim 1 wherein the second sidewall tapers in the direction of the proximal face.

10. A thoroughfare lighting device comprising:
a housing configured to be attached to a thoroughfare surface, having a top surface, a proximal face, a distal face, and first and second opposing sidewalls extending between the proximal and distal faces and extending downwardly from the top surface;
a driver circuit;
a plurality of light-emitting diodes (LEDs) electrically coupled to the driver circuit, the plurality of LEDs comprising:
a first set of LEDs configured to emit a generally white light and positioned so as to emit light in the direction of a surface of an associated thoroughfare, and
a second set of LEDs configured to emit colored light in a direction so as to be observable by an observer that is operable to selectively emit light so as to illuminate individual lanes of the thoroughfare surface;
an optic carried by the housing and positioned in optical communication with the plurality of LEDs; and
a communication device electrically coupled to the driver circuit;
wherein the communication device is configured to receive information related to a condition of the thoroughfare;
wherein the driver circuit is configured to operate the plurality of LEDs responsive to the information received from the communication device;
wherein the driver circuit is configured to operate the second set of LEDs to emit a red light to indicate a stop in traffic;
wherein the driver circuit is configured to operate the second set of LEDs to emit a yellow or amber light to indicate a slow-down in traffic;
wherein the driver circuit is configured to operate the second set of LEDs to emit a blue light to indicate the presence or imminent arrival of an emergency vehicle; and
wherein the first sidewall tapers in a direction of the distal face;
wherein the optic is a first optic and carried by the first sidewall;
wherein the lighting device further comprises a second optic carried by the second sidewall; and
wherein the plurality of LEDs is divided such that a portion of each of the first and second sets of LEDs are in optical communication with the first optic and another portion of each of the first and second sets of LEDs are in optical communication with the second optic.

11. The thoroughfare lighting device according to claim 10 wherein the first set of LEDs is configured to selectively illuminate individual lanes of the associated thoroughfare.

12. The thoroughfare lighting device according to claim 10 further comprising a traffic sensor electrically coupled to the driver circuit; wherein the traffic sensor is configured to sense traffic patterns and generate information regarding traffic on the associated thoroughfare; and wherein the driver circuit is configured to operate the plurality of LEDs responsive to the information generated by the traffic sensor.

13. The thoroughfare lighting device according to claim 10 wherein the second sidewall tapers in the direction of the proximal face.

14. The thoroughfare lighting device according to claim 10 wherein the second sidewall tapers in the direction of the distal face.

* * * * *